United States Patent
Bott et al.

(10) Patent No.: US 9,902,635 B2
(45) Date of Patent: Feb. 27, 2018

(54) METHOD FOR DEAMMONIFICATION PROCESS CONTROL USING PH, SPECIFIC CONDUCTIVITY, OR AMMONIA

(71) Applicant: Hampton Roads Sanitation District, Virginia Beach, VA (US)

(72) Inventors: Charles Bott, Virginia Beach, VA (US); Stephanie Klaus, Virginia Beach, VA (US)

(73) Assignee: Hampton Roads Sanitation District, Virginia Beach, VA (US)

( * ) Notice: Subject to any disclaimer, the term of this patent is extended or adjusted under 35 U.S.C. 154(b) by 52 days.

(21) Appl. No.: 14/806,524

(22) Filed: Jul. 22, 2015

(65) Prior Publication Data
US 2016/0023932 A1 Jan. 28, 2016

Related U.S. Application Data

(60) Provisional application No. 62/028,185, filed on Jul. 23, 2014, provisional application No. 62/085,959, filed on Dec. 1, 2014.

(51) Int. Cl.
C02F 3/30 (2006.01)
C02F 3/10 (2006.01)
(Continued)

(52) U.S. Cl.
CPC .............. *C02F 3/301* (2013.01); *C02F 3/006* (2013.01); *C02F 3/105* (2013.01); *C02F 3/302* (2013.01);
(Continued)

(58) Field of Classification Search
CPC ...... C02F 3/301; C02F 3/302; C02F 2101/16; C02F 3/006; C02F 3/105; C02F 2209/001;
(Continued)

(56) References Cited

U.S. PATENT DOCUMENTS

| 4,056,465 A | 11/1977 | Spector |
| 5,582,733 A | 12/1996 | Desbos et al. |

(Continued)

FOREIGN PATENT DOCUMENTS

| DE | 3628203 | 2/1988 |
| DE | 4016457 | 2/1992 |

(Continued)

OTHER PUBLICATIONS

Chudoba et al. "Control of Activated Sludge Filamentous Bulking II. Selection of Microorganisms by Means of a Selector," Water Res., 7, 1389, 1973 pp. 1389-1406.

(Continued)

*Primary Examiner* — Fred Prince
(74) *Attorney, Agent, or Firm* — Leason Ellis LLP

(57) ABSTRACT

A method and a system as described herein, including a method and system of treating ammonium containing water in a deammonification MBBR process where partial nitritation and anaerobic ammonium oxidation may occur simultaneously in a biofilm, or in an integrated fixed film activated sludge process where partial nitritation takes place in a suspended growth fraction and anaerobic ammonium oxidation occurs in a biofilm. The method and system include controlling airflow to the reactor to achieve a target pH, a target alkalinity, a target specific conductivity, and/or a target ammonium concentration in the reactor or in the effluent.

26 Claims, 21 Drawing Sheets

(51) Int. Cl.
*C02F 3/00* (2006.01)
*C02F 101/16* (2006.01)

(52) U.S. Cl.
CPC .... *C02F 2101/16* (2013.01); *C02F 2209/001* (2013.01); *C02F 2209/003* (2013.01); *C02F 2209/005* (2013.01); *C02F 2209/05* (2013.01); *C02F 2209/06* (2013.01); *C02F 2209/07* (2013.01); *C02F 2209/14* (2013.01); *C02F 2209/22* (2013.01); *C02F 2209/38* (2013.01); *Y02W 10/15* (2015.05)

(58) Field of Classification Search
CPC .......... C02F 2209/003; C02F 2209/005; C02F 2209/05; C02F 2209/06; C02F 2209/07; C02F 2209/14; C02F 2209/22; C02F 2209/38; Y02W 10/15
USPC ....... 210/605, 614, 615, 616, 617, 630, 631, 210/903
See application file for complete search history.

(56) References Cited

U.S. PATENT DOCUMENTS

| | | | |
|---|---|---|---|
| 5,863,435 | A | 1/1999 | Heijnen et al. |
| 6,183,642 | B1 | 2/2001 | Heijnen et al. |
| 6,383,390 | B1 | 5/2002 | Van Loosdrecht et al. |
| 6,406,617 | B1 | 6/2002 | Brauchli |
| 6,566,119 | B1 | 5/2003 | Heijnen et al. |
| 6,605,220 | B2 | 8/2003 | Garcia et al. |
| 6,645,386 | B1 | 11/2003 | Moreau et al. |
| 7,060,185 | B2 | 6/2006 | Kim et al. |
| 7,273,553 | B2 | 9/2007 | Van Loosdrecht et al. |
| 7,569,147 | B2 | 8/2009 | Curtis et al. |
| 7,846,334 | B2 | 12/2010 | Wett |
| 8,157,988 | B2 | 4/2012 | Quevillon |
| 8,268,169 | B2 | 9/2012 | Lean et al. |
| 8,911,628 | B2 | 12/2014 | Nyhuis |
| 2005/0087480 | A1 | 4/2005 | Park et al. |
| 2006/0283796 | A1* | 12/2006 | Tokutomi ................ C02F 3/006 210/631 |
| 2007/0000836 | A1 | 1/2007 | Elefritz et al. |
| 2008/0223784 | A1* | 9/2008 | Martin ..................... C02F 1/008 210/630 |
| 2008/0223789 | A1 | 9/2008 | Hasan et al. |
| 2009/0221054 | A1 | 9/2009 | Wett |
| 2009/0221854 | A1 | 9/2009 | Oevering et al. |
| 2009/0272690 | A1 | 11/2009 | Wett |
| 2009/0282882 | A1 | 11/2009 | Verhave et al. |
| 2010/0170845 | A1 | 7/2010 | Baur |
| 2010/0288693 | A1 | 11/2010 | Vion et al. |
| 2011/0198284 | A1 | 8/2011 | Nyhuis |
| 2011/0284461 | A1 | 11/2011 | Dimassimo et al. |
| 2012/0048802 | A1 | 3/2012 | Brown et al. |
| 2013/0256217 | A1 | 10/2013 | Lemaire et al. |
| 2014/0069863 | A1* | 3/2014 | Wett ........................ C02F 3/006 210/605 |
| 2014/0069864 | A1 | 3/2014 | Well et al. |
| 2014/0144836 | A1 | 5/2014 | Nyhuis et al. |
| 2014/0263041 | A1* | 9/2014 | Regmi .................... C02F 3/006 210/605 |
| 2014/0305867 | A1 | 10/2014 | Nyhuis |
| 2014/0360933 | A1* | 12/2014 | Rezania .................. C02F 3/303 210/605 |

FOREIGN PATENT DOCUMENTS

| | | |
|---|---|---|
| DE | 19855794 | 6/2000 |
| DE | 10 2005 045 170 | 3/2007 |
| EP | 0872451 | 12/2012 |
| EP | 2740713 A1 | 6/2014 |
| ES | 2334321 A1 | 3/2010 |
| FR | 2985996 A1 | 7/2013 |
| JP | 2001-096297 | 4/2001 |
| JP | 2003088889 A | 3/2003 |
| JP | 2008221160 A | 9/2008 |

OTHER PUBLICATIONS

Gabb et al. "The Selector Effect on Filamentous Bulking in Long Sludge Age Activated Sludge Systems," Water Sci. Technol., vol. 23, Kyoto, pp. 867-877, 1991.

Jenkins et al. "Manual on the Causes and Control of Activated Sludge Bulking, Foaming, and Other Solids Separation Problems," 3rd edition, Lewis Publishers, USA, 2004.

Marshall et al. "Selectors in Pulp and Paper Mill-activated Sludge Operations: Do they work?" Pulp and Paper Canada, 101(3), 48-53, 2000.

Lebek et al. "Control of the Growth of Microthrix parvicella by Using an Aerobic Selector—Results of Pilot and Full Scale Plant Operation," Water Sci. Technol., 46(1-2), 2002, pp. 491-494.

Marten et al. "Full-scale evaluation of factors affecting the performance of anoxic selectors," Water Environ. Res., 69(7), 1272-1289, 1997.

Parker et al. "Discussion of: Full-scale evaluation of factors affecting the performance of anoxic selectors," Water Environ. Res., 70(6), 1225-1228, 1998.

Schuler et al., "Microbial storage products, biomass density, and settling properties of enhanced biological phosphorus removal activated sludge," Water Sci. Technol., vol. 43, No. 1, pp. 173-180, 2001.

Davoli et al.. "Testing the effect of selectors in the control of bulking and foaming in small activated sludge plants," Water Sci Technol. 46(1-2):495-8, 2002.

Parker et al. "Making classifying selectors work for foam elimination in the activated sludge process," Water Environ. Res., 75 (1), 83-91, 2003.

Morgenroth et al. "Aerobic Granular Sludge in a Sequenencing Batch Reactor," Water Research, vol. 31 No. 12 pp. 3191-3194, 1997.

Dangeong Peng et al. "Aerobic Granular Sludge," A Case Report Water Research, vol. 33 No. 3 pp. 880-893, 1999.

Abeling et al. "Anaerobic-Aerobic Treatment of High Strength Ammonium Wastewater—Nitrogen Removal via Nitrite," Wat. Sci. Tech. vol. 26, No. 5-6, pp. 1007-1015, 1992.

Alleman et al. "Storage-Induced Denitrification Using Sequencing Batch Reactor Operation," Water Research vol. 14. pp. 1483-14885, 1980.

Anthonisen et al. "Inhibition of Nitrification by Ammonia and Nitrous Acid," Water Pollution Control Federation vol. 28, No. 5, pp. 835-852, 1976.

Daebel et al. "Exploring Temporal Variations of Oxygen Saturation Constants of Nitrifying Bacteria," Water Research 41, PP. 1094-1102, 2007.

Guo et al. "Effective and Robust Partial Nitrification to Nitrite by Real-time Aeration Duration Control in an SBR Treating Domestic Wastewater," Process Biochemistry 44, 2009, pp. 979-985.

Hanaki et al. "Nitrification at Low Levels of Dissolved Oxygen With and Without Organic Loading in a Suspended-Growth Reactor," Wat. Res. vol. 24, No. 3, pp. 297-302, 1990.

Hellinga et al. "The Sharon Process: An Innovative Method for Nitrogen Removal From Ammonium-Rich Waste Water," Water Science and Technology vol. 37 Issue 9, pp. 135-142, 1998.

Hippen et al. "Aerobic Deamoonification: A New Experience in the Treatment of Wastewaters," Wat. Sci. Tech. vol. 35, No. 10, pp. 111-120, 1997.

Ju et al. "Simultaneous Nitrification, Denitrification, and Phosphorous Removal in Single-Tank Low-Dissolved-Oxygen Systems Under Cyclic Aeration," Water Env. Res., 2007, vol. 78, No. 8.

Kim et al. "Comparison Study of the Effects of Temperature and Free Ammonia Concentration on Nitrification and Nitrite Accumulation," Process Biochemistry 43, 154-160, 2008.

Kornaros et al. "Partial Nitrification/Denitrification Can be Attributed to the Slow Response of Nitrite Oxidizing Bacteria to Periodic Anoxic Disturbances," Env. Sci., 2008, Environ. Sci. Technol. 2010, 7245-7253.

(56) References Cited

OTHER PUBLICATIONS

Laanbroek et al. "Competition for Limiting Amounts of Oxygen between Nitrosomonas Europaea and Nitrobacter Winogradskyi Grown in Mixed Continuous Cultures," Arch Micro, 1993, Arch Microbiol (1993) 159: 453-459.
Li et al. "Partial Nitritation of Landfill Leachate with Varying Influent Composition under Intermittent Aeration Conditions," Process Safety and Env. Prot. V 91 Issue 4, 2013.
Ling, "Experience from Commissioning of Full-scale DeAmmon plant at Himmerfjarden," Proceedings of 2nd IWA Specialized Conference, Lemtech Konsulting, ed., pp. 403-410.
Peng et al. "Nitrite Accumulation by Aeration Controlled in Sequencing Batch Reactors Treating Domestic Wastewater," Water Sci. Tech. vol. 50 No. 10 pp. 35-43, 2004.
Peng et al. "Partial Nitrification from Domestic Wastewater by Aeration Control at Ambient Temperature," Chin. J. Chem. Eng., 15(1) 115-121, 2007.
Silverstein et al. "Performance of SBR Activated Sludge Processes with Nitrification/Denitrification," Water Pollution Control Fed., vol. 55, No. 4, pp. 377-384, 1983.
Turk et al. "Preliminary Assessment of a Shortcut in Nitrogen Removal from Wastewater," Canadian Journal of Civil Engineering, vol. 13, Issue 6, 1986.
Turk et al. "Maintaining Nitrite Build-Up in a System Acclimated to Free Ammonia," Wat. Res. vol. 23, No. 11, pp. 1383-1388, 1989.
Wong-Chong et al. "Kinetics of Microbial Nitrification: Nitrite-Nitrogen Oxidation," Wat. Res. vol. 12. pp. 605-609, 1978.
Yang et al. "Nitrogen Removal via Short-Cut Simulataneous Nitrification and Denitrification in an Intermittently Aerated Moving Bed Membrane Bioreactor," Haz. Mat. 195, 2011.
Yoo et al. "Nitrogen Removal From Synthetic Wastewater by Simultaneous Nitrification and Denitrification and Denitrification via Nitrite in an Intermittently-Aerated Reactor,", Wat. Res. vol. 33, No. 1, pp. 145-154 1999.
Zeng et al. "Control and Optimization of Nitrifying Communities for Nitritation from Domestic Wastewater at Room Temperature," Enzyme and Microb. Tec. 45, pp. 226-232, 2009.
Gao, et al. "Shortcut nitrification-denitrification by real-time control strategies," Bioresource Technology; journal homepage: www.elsevier.com/locate/biortech; p. 2298-2300, (2009).
C.S.Gee, et al. "Nitrite accumulation followed by denitrification using sequencing batch reactor," Water Science and Technology vol. 49 No. 5 pp. 47-55, (2004).
A.N. Katsogiannis, et al. "Enhanced nitrogen removal in SBRs bypassing nitrate generation accomplished by multiple aerobic/anoxic phase pairs" Water Science and Tech. vol. 47, No. 11, pp. 53-59 (2003).
Romain Lemaire, et al. "Achieving the Nitrite Pathway Using Aeration Phase Length Control and Step-Feed in an SBR Removing Nutrients form Abattoir Wastewate" Biotechnology, and Bioengineering (2008).
Manser, et al. "Consequencies of mass transfer effects on the kinetics of nitrifiers" Water Research 39 (2005) pp. 4633-4642.
Pollice, et al. "Influence of aeration and sludge retention time on ammonium oxidation to nitrite and nitrate" Water Research 36 (2002) pp. 2541-2546.

Sin, et al. "Modelling nitrite in wastewater treatment systems: a discussion of different modelling concepts" Water Science & Technology 58.6 2008 pp. 1155-1171.
Sliekers, et al. "Competition and coexistence of aerobic ammonium- and nitrite-oxidizing bacteria at low oxygen concentrations", Appl. Microbiol Biotechnol (2005) 68: 808-817.
Van Dongen, et al. "The SHARON-Anammox Process for treatment of ammonium rich wastewater" Water Science and Technology vol. 44 No. 1 p. 153-160, (2001).
Wett "Sloved upscaling problems for implementing deammonificationof rejection water" Water Science & Technology vol. 53 No. 12 p. 121-128, (2006).
Wett, et al. "Syntrophy of Aerobic and Anaerobic Ammonia Oxidisers" Water Science & Technology—WST 61.8 2010 pp. 1915-1922.
Wyffels, et al. "Nitrogen removal from sludge reject water by a two-stage oxygen-limited autotrophic nitrification denitrification process" Water Science and Technology vol. 49, No. 5-6, pp. 57-64 (2004).
Yu, et al. "Performance Enhancement of SBR Applying Real-Time Control" Journal of Environmental Engineering; Oct. 2000 pp. 943-948.
Zekker, et al. "Achieving nitritation and anammox enrichment in a single moving-bed biofilm reactor treating reject water" Environmental Technology, 33:6, 703-710, (2012).
Zeng, et al. "Process Control of an Alternation Aerobic-Anoxic Sequencing BAtch Reactor for Nitrogen Removal via Nitrite" Chem. Eng. Technol. 2008, 31, No. 4, 582-587.
Bernet, et al. "Nitrification at Low Oxygen Concentration in Biofilm Reactor" Journal of Environmental Engineering Mar. 2001 pp. 266-271.
Blackburn, et al "Partial nitrification to nitrite using low dissolved oxygen concentraion as the main factor" Springer Sciecnce+Business Media B.V. 2007.
Ciudad, et al. "Partial nitrification of high ammonia concentration wastewater as a part of a shortcut biological nitrogen removal process" Process Biochemistry 40 (2005), 1715-1719.
Fux, et al. "Biological treatment of ammonium-rich wastewater by partial nitritation and subsequent anaerobic ammonium oxidation (anammox) in a pilot plant" Journal of Biotechnology 99 (2002) 295-306.
Wett, "Development and implementation of a robust deammonification process," Water Science & Technology, vol. 56, No. 7, pp. 81-88 (2007).
Trollberg, O. "Extremum Seeking Control Applied to a Deammonification Process", Thesis work—Department of Information Technology, Uppsala universitet [online] Mar. 2011; Retrieved from the internet <URL: http://sjostad.ivl.se/download/18.50a499dd132037d524e80007759/1350483758748/Olle_Trollberg.pdf>.
Wett, B., et al. "Key Parameters for Control of Demon Deammonification Process", Water Practice, vol. 1, No. 5, pp. 1-11, [online] Nov. 2007; Retrieved from the internet <URL: http://www.essdemon.com/libraries.files/eyparametersDEMONControl.pdf>.
IPRP for PCT International Application No. PCT/US2015/041622 dated Jan. 24, 2017.

\* cited by examiner

METHOD FOR DEAMMONIFICATION PROCESS CONTROL USING PH, SPECIFIC CONDUCTIVITY, OR AMMONIA

CROSS REFERENCE TO PRIOR APPLICATIONS

This application claims priority to and the benefit thereof from U.S. Provisional Patent Application No. 62/028,185, filed Jul. 23, 2014, titled "METHOD FOR DEAMMONIFICATION PROCESS CONTROL USING pH, SPECIFIC CONDUCTIVITY, OR AMMONIA," and U.S. Provisional Patent Application No. 62/085,959, filed Dec. 1, 2014, titled "A METHOD FOR DEAMMONIFICATION PROCESS CONTROL USING pH, SPECIFIC CONDUCTIVITY, OR AMMONIA," the entireties of which are incorporated herein by reference and thereby fully set forth herein.

FIELD OF THE DISCLOSURE

The present disclosure relates to a system and a method for treating wastewater, or the like.

BACKGROUND OF THE DISCLOSURE

Deammonification is a two-step process for biological treatment of ammonium-containing waters which combines partial nitritation and anaerobic ammonium oxidation (anammox). In the first step, aerobic ammonium oxidizing bacteria ("AOB") convert about 50% of the incoming ammonia to nitrite. In the second step, anaerobic ammonium oxidizing bacteria ("AMX") convert the remaining ammonium and nitrite to nitrogen gas and a small amount of nitrate. This reaction can take place in two separate reactors, with partial nitritation occurring in an aerobic reactor followed by anammox occurring in an anoxic reactor (see e.g., U.S. Pat. No. 6,485,646 B1), or it can take place in a single reactor. A number of single reactor configurations exist including upflow granular sludge, moving bed biofilm reactor (MBBR), and sequencing batch reactor ("SBR") with biomass separation device (see e.g., U.S. Patent Application Publication No. US2011/0198284 A1). Deammonification provides an advantage over traditional nitrification-denitrification in that it consumes 100% less organic carbon, produces 90% less sludge and consumes 60% less oxygen.

The deammonification "MBBR" process consists of a continuously stirred-tank reactor containing buoyant free-moving plastic biofilm carriers kept in suspension in the bulk liquid by aeration or mechanical mixing. The conversion of ammonium takes place in a biofilm attached to the plastic biofilm carriers in which AOB exist on the exterior of the biofilm, while AMX exist deeper within the biofilm in an anoxic environment.

The key parameters for control of this process are influent flow and dissolved oxygen ("DO") concentration. Flow of water to the reactor determines the ammonium load on the system as well as incoming alkalinity. It is desirable to maintain a low dissolved oxygen concentration (e.g., <2 mg/L) in the reactor to limit the potential growth of nitrite oxidizing bacteria ("NOB") and to avoid inhibition of AMX by the diffusion of oxygen into the anoxic zone of the biofilm. The DO concentration in the reactor is determined by airflow to the reactor, biological activity in the reactor, and temperature. Alkalinity is consumed by the bacteria to complete ammonium oxidation. If the alkalinity consumed by the bacteria is greater than the influent alkalinity, then the pH in the reactor will decrease. If alkalinity consumed by the bacteria is less than the influent alkalinity, then the pH in the reactor will increase.

A deammonification MBBR process can be operated with intermittent aeration. See, e.g., Zubrowska-Sudol, M., Yang, J., Trela, J., Plaza, E., "Evaluation of deammonification process performance at different aeration strategies," published in Water Science and Technology. 63(6), 1168-1176 (2011); and Ling D., "Experience from commissioning of full-scale DeAmmon™ plant at Himmerfiarden (Stockholm)," published in 2nd IWA Specialized Conference on Nutrient Management in Wastewater Treatment Processes (2009). However, continuous aeration is preferred due to simplicity of operation, more accurate readings of online signals, and elimination of the need for mechanical mixing during non-aerated phases. Online measurements from probes located in the reactor or in the effluent can be used for monitoring performance of the process. This includes some combination of the following probes: pH, specific conductivity, ammonium concentration, nitrate concentration, nitrite concentration, or dissolved oxygen concentration. In addition an air flow meter in combination with an air flow control valve modulates airflow to the reactor based on signals from one or more of the aforementioned probes. This could also be achieved by a dedicated blower that is controlled to deliver a target air flow rate. The reactor cannot be operated without some form of aeration control due to the possibility of over-aeration leading to the accumulation of nitrite which is irreversibly inhibitory to AMX at high concentrations.

It is known that pH, conductivity, and DO sensors can be used to determine the intermittent air ON and OFF cycles in an intermittently aerated SBR (see, e.g., U.S. Pat. Nos. 7,846,334 B2 and 8,298,422 B2). It is also known that DO based aeration control can be used in a deammonification MBBR process (see e.g., U.S. Patent Application Publication No. US2013/0256217 A1 and U.S. Pat. No. 8,057,673 B2).

U.S. Pat. No. 7,846,334 B2 describes a method for treating ammonium-containing water in an intermittently aerated deammonification SBR in which the length of the aerated and non-aerated phases is controlled by a low and high pH setpoint. See also Wett, "Development and implementation of a robust deammonification process," published in Water Science and Technology, 56 (7) 81-88 (2007). This method is specific to an intermittently fed, intermittently aerated SBR with the fluctuation of the range of pH values being at most 0.05 and the DO concentration being kept between 0.2 mg/L and 0.4 mg/L.

U.S. Pat. No. 8,298,422 B2 describes a method for treating ammonium-containing water in an intermittently aerated deammonification SBR in which a conductivity and/or DO concentration in the reactor determines the length of the aerated and non-aerated phases.

Joss, A., Siegrist, H., Salzgeber, D., Eugster, J., König, R., Rottermann, K., Burger, S., Fabijan, P., Leumann, S. & Mohn, J., "Full-scale nitrogen removal from digester liquid with partial nitritation and anammox in one SBR," published in Environmental Science & Technology, 43(14), 5301-5306 (2009) describes a method for treating ammonium-containing water in a continuously or intermittently aerated deammonification SBR in which a conductivity or ammonia setpoint determines the end of the reaction phase of the SBR. In this method the conductivity or ammonia signal is not controlling the aeration but rather the length of the overall SBR cycle.

U.S. Patent Application Publication No. US2013/0256217 A1 describes a method for treating ammonium-containing water in a deammonification MBBR in which a DO setpoint is periodically adjusted by the controller based on ammonia removal and nitrate production ratios in the reactor. The ratios are calculated from sensor values in the tank and the DO setpoint is incrementally increased or decreased if the ratios fall outside of an optimal zone. A goal of this method may be to maximize ammonia removal by increasing the DO setpoint until an optimal ammonia removal percentage is met. However this method does not protect against running out of alkalinity in the reactor resulting in a dramatic decrease in pH. If the DO concentration setpoint is too high, then the pH will continue to decrease until all of the incoming alkalinity is consumed.

A key to the operation of deammonification reactors is the inhibition of nitrite oxidizing bacteria ("NOB") that compete with anammox for substrate and for space within the biofilm. Strategies for inhibition of NOB include high free ammonia concentration, low dissolved oxygen concentration, high temperature, and transient anoxia. The method described in U.S. Patent Application Publication No. US2013/0256217 A1 aims to limit NOB growth by using a controller to decrease the DO setpoint when the nitrate production ratio is above the value that would be expected to be produced by AMX alone. If nitrate production is higher than 10-15% (indicating proliferation of NOB), then the process DO is limited in an effort to control NOB activity at the expense of losing NH4 removal.

U.S. Pat. No. 8,057,673 B2 describes a method for treating ammonium containing water in a two-reactor deammonification system in which partial nitration takes place in the first reactor and anammox takes place in the second reactor. The first reactor is aerated to meet a DO setpoint between 0.5 mg/L and 1 mg/L. The pH in the first reactor is controlled to be between 7.5 and 8. In this method, the pH signal is not used to control aeration, but, instead, it is used to control the pH with the intent of inhibiting NOB in the aerobic reactor.

U.S. Pat. No. 8,268,173 B2 describes a method for controlling aeration in an integrated fixed film activated sludge ("IFAS") process based on DO and ammonia concentration to account for variations in the amount of nitrifying biomass on the carriers versus the amount of nitrifying biomass in the mixed liquor. This method does not refer to a deammonification IFAS process (AOB in the mixed liquor and AMX on the carriers) but rather a process in which nitrification (AOB and NOB) takes place on both the carriers and in the mixed liquor.

SUMMARY OF THE DISCLOSURE

According to aspects of the disclosure, a method and system of controlling treating ammonium containing water in a deammonification MBBR process are provided herein. In the method and the system, partial nitration and anaerobic ammonium oxidation may occur simultaneously in a biofilm, or in an integrated fixed film activated sludge process (e.g., where partial nitration takes place in a suspended growth fraction and anaerobic ammonium oxidation occurs in a biofilm). The method may include controlling airflow to the reactor to achieve a target pH, a target alkalinity, a target specific conductivity, and/or a target ammonium concentration in the reactor or in the effluent. The method may also include sensing and monitoring pH, alkalinity, specific conductivity, and/or ammonium concentration via signals (e.g., four signals) received from one or more sensors placed in the reactor and/or effluent.

In a deammonification MBBR, the ammonium concentration in the effluent corresponds to a given pH, alkalinity, and specific conductivity, so the four signals can be used interchangeably. It is desirable to maintain a constant pH (e.g., ammonium, alkalinity, and specific conductivity) in the effluent to maintain near-complete use of influent alkalinity and the lowest possible ammonium concentration in the effluent. It is difficult to achieve this using DO control alone due to changes in influent ammonium concentration and alkalinity and changes in oxygen demand in the reactor. By controlling aeration based on pH, alkalinity, ammonium, or specific conductivity the alkalinity consumed in the reactor may be controlled to nearly equal the alkalinity in the influent, thereby avoiding the possibility of drastic reductions in pH due to depletion of alkalinity. Controlling based on pH, alkalinity or specific conductivity provides an added advantage of measuring and ensuring residual alkalinity while ammonia does not. Controlling airflow based on pH, alkalinity, ammonium concentration, or specific conductivity results in more consistent effluent characteristics with less operator input than DO based aeration control, as well as avoids problems associated with ammonium being removed to levels that result in AOB or anammox activity limitations, and the subsequent induction of NOB growth. Use of pH or specific conductivity probes also gives the advantage of using a robust sensor for control.

In each of a plurality of control modes, the pH, alkalinity, specific conductivity, or ammonium concentration setpoint(s) can control the air flow control valve position directly, control the air flow setpoint which controls the air valve position, or control the dissolved oxygen setpoint which controls the air flow setpoint which control the air valve position (cascade control). The control is accomplished with an appropriately tuned proportional, proportional-integral, proportional-integral-derivative, or logic-based algorithm.

If NOB growth does occur, resulting in an increase in effluent nitrate, the pH, alkalinity, specific conductivity, or ammonium concentration setpoints are increased (decreasing the airflow rate) until the nitrate production ratio is less than the value that would be expected to be produced by AMX alone (10-15%). The nitrate production ratio may be defined by the following equation:

$$NO_3 \text{ production ratio} = \frac{\text{Effluent NO}_3 - \text{Influent NO}_3}{\text{Influent NH}_4 - \text{Effluent NH}_4} \times 100 \quad \text{(Equation 1)}$$

According to an aspect of the disclosure, a method of treating ammonium containing water in a wastewater treatment site is provided herein. The method comprises receiving a plurality of sensor signals, the plurality of sensor signals comprising at least one of a pH level, an alkalinity level, a specific conductivity level, and an ammonium concentration level; and controlling flow of a gas into the wastewater treatment site to meet at least one of a target specific conductivity level, a target ammonium concentration level, a target alkalinity level, and a target pH level based on one or more of the plurality of sensor signals. The controlling flow of a gas to meet the at least one of the target specific conductivity level, target ammonium concentration level, target alkalinity level, and target pH level can be in a continuous flow moving bed biofilm reactor in which partial nitration and anaerobic ammonium oxidation both occur on a biofilm carrier. The controlling flow of a gas to meet the at least one of the target specific conductivity level, target ammonium concentration level, target alkalinity level, and target pH level can be in a continuous flow integrated fixed film activated sludge reactor in which partial nitritation occurs in a bulk suspended biomass fraction and anaerobic ammonium oxidation occurs on a biofilm carrier.

The method may further comprise measuring at least one of the specific conductivity level, ammonium concentration level, alkalinity level, and pH level in a reactor.

The method may further comprise measuring at least one of the specific conductivity level, ammonium concentration level, alkalinity level, and pH level in the effluent from a reactor.

The gas may comprise air or purified oxygen or a blend thereof.

The method may further comprise controlling a gas valve position based on the at least one of the specific conductivity level, ammonium concentration level, alkalinity level, and pH level.

The method may further comprise controlling a blower output based on the at least one of the specific conductivity level, ammonium concentration level, alkalinity level, and pH level.

The method may further comprise controlling a gas flow rate setpoint based on the at least one of the specific conductivity level, ammonium concentration level, alkalinity level, and pH level.

The method may further comprise controlling a valve position or a blower output based on a gas flow rate setpoint.

The method may further comprise controlling a dissolved oxygen setpoint based on the at least one of the specific conductivity level, ammonium concentration level, alkalinity level, and pH level.

The method may further comprise controlling a gas flow rate setpoint based on the dissolved oxygen setpoint.

The method may further comprise decreasing the flow of gas and/or a dissolved oxygen level when the specific conductivity level is lower than a specific conductivity setpoint.

The method may further comprise increasing the flow of gas and/or a dissolved oxygen level when the specific conductivity level is higher than a specific conductivity setpoint.

The method may further comprise decreasing the flow of gas and/or a dissolved oxygen level when the ammonium concentration level is lower than an ammonium concentration setpoint.

The method may further comprise increasing the flow of gas and/or a dissolved oxygen level when the ammonium concentration level is higher than an ammonium concentration setpoint.

The method may further comprise decreasing the flow of gas and/or a dissolved oxygen level when the pH level is lower than a pH setpoint.

The method may further comprise increasing the flow of gas and/or a dissolved oxygen level when the pH level is higher than a pH setpoint.

The method may further comprise decreasing the flow of gas and/or a dissolved oxygen level when the alkalinity level is lower than an alkalinity setpoint.

The method may further comprise increasing the flow of gas and/or a dissolved oxygen level when the alkalinity level is higher than an alkalinity setpoint.

The controlling of flow of the gas may comprise an appropriately tuned proportional, a proportional-integral, a proportional-integral-derivative, or a logic-based process.

The method may further comprise measuring nitrate and ammonia in an influent and in an effluent to determine a nitrate production ratio level.

The specific conductivity level may be controlled according to a nitrate production ratio setpoint such that when the nitrate production ratio level is higher than the nitrate production ratio setpoint the specific conductivity setpoint is increased.

The ammonium concentration level may be controlled according to a nitrate roduction ratio setpoint such that when the nitrate production ratio level is higher than the nitrate production ratio setpoint the ammonium concentration setpoint is increased.

The pH may be controlled according to the nitrate production ratio setpoint such that when the nitrate production ratio level is higher than the nitrate production ratio setpoint the pH setpoint is increased.

The alkalinity may be controlled according to the nitrate production ratio setpoint such that when the nitrate production ratio is higher than the nitrate production ratio setpoint the alkalinity setpoint is increased.

DETAILED DESCRIPTION OF THE DISCLOSURE

Figure 1:
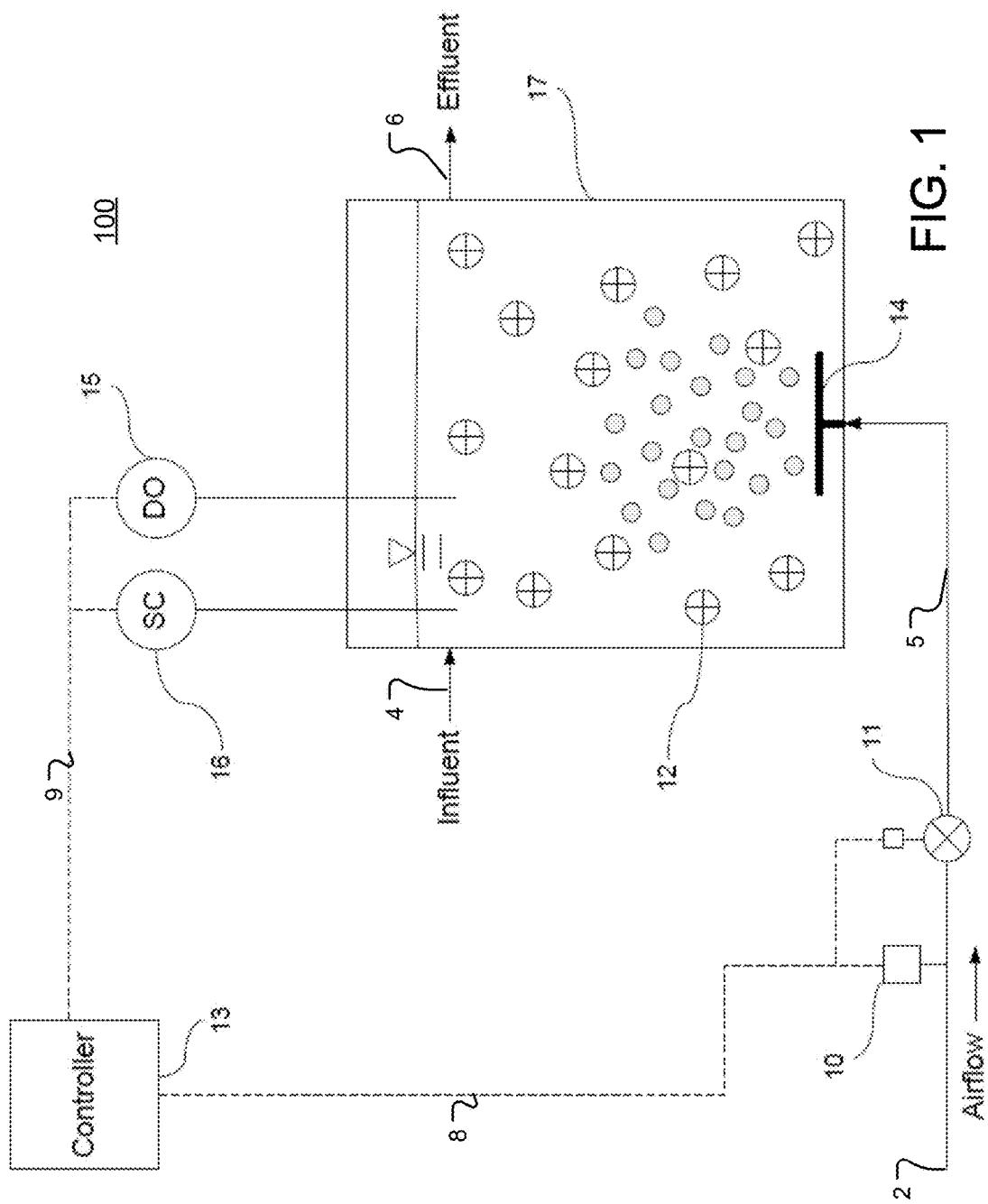
FIG. 1 shows a cross-sectional view of an example of a specific conductivity (SC) control system for controlling treating ammonium containing water in a deammonification MBBR process in which partial nitritation and anaerobic ammonium oxidation occur simultaneously, constructed according to the principles of the disclosure.

The disclosure and the various features and advantageous details thereof are explained more fully with reference to the non-limiting embodiments and examples that are described and/or illustrated in the accompanying drawings and detailed in the description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

According to an aspect of the disclosure, a method and a system are provided herein for treating ammonium containing water in a deammonification MBBR process where partial nitration and anaerobic ammonium oxidation may occur simultaneously in a biofilm, or in an integrated fixed film activated sludge (IFAS) process where partial nitration takes place in a suspended growth fraction and anaerobic ammonium oxidation occurs in a biofilm. The method and system include, among other things, controlling airflow to a reactor to achieve a target pH, a target alkalinity, a target specific conductivity, and/or a target ammonium concentration in the reactor or in the effluent. According to a non-limiting example of the instant disclosure, a target pH may be, for example, between about 6.0 and about 7.0; a target alkalinity may be, for example, between about 50 mg/L as $CaCO_3$ and about 350 mg/L as $CaCO_3$; a target specific conductivity that is determined based on the matrix; and a target ammonium concentration may be, for example, between about 25 mg/L and about 300 mg/L. Further, the target dissolved oxygen level may be, for example, between about 0.1 mg/L and about 2.0 mg/L. The foregoing ranges of values, as understood by those skilled in the art, may vary significantly from the mentioned values, depending on, for example, wastewater characteristics, ambient conditions, treatment goals of each individual plant, etc. The target pH, alkalinity, specific conductivity and ammonium concentration values may be set as the pH setpoint, alkalinity setpoint, specific conductivity setpoint, and ammonium concentration setpoint, respectively. The system may automatically adjust air flow and/or dissolved oxygen levels, as described herein, so as to achieve one or more of the setpoint values.

FIG. 1 shows a cross-sectional view of an example of a specific conductivity ("SC") control system 100 for controlling treating ammonium containing water in a deammonification MBBR process in which partial nitration and anaerobic ammonium oxidation may occur simultaneously, constructed according to the principles of the disclosure. The SC control system 100 comprises a gas inlet 2, an influent 4 inlet and an effluent outlet 6. The SC control system 100 further comprises a gas flow meter 10, a gas flow valve 11, a controller 13, a gas diffuser 14, a plurality of sensors 15, 16, 21 (shown in FIG. 6), 22 (shown in FIG. 11), 23 (shown in FIG. 20) and a reactor 17.

The gas inlet 2 is configured to receive a gas (e.g., air, oxygen, etc.) and supply the gas to the diffusers 14 via a conduit 5. The gas flow in the conduit 5 may be controlled by the gas flow valve 11. The gas flow meter 10 is configured to measure the gas flow in the conduit leading to the diffusers 14 and communicate a gas flow measurement signal to the controller 13 via a communication link 8. The controller 13 is configured to receive the gas flow measurement signal and generate a gas flow control signal, which is sent to the gas flow valve 11 over the communication link 8 to control the rate of gas flowing through the conduit 5 to the diffusers 14.

The gas flow control valve 11 may include, e.g., a modulating airflow control valve. The gas flow meter 10 may be located upstream of the gas flow control valve 11 and provide gas flow rate feedback in the gas flow measurement signal to the controller 13 through the communication link 8.

The reactor 17 may include, e.g., a moving bed biofilm reactor. The sensors 15, 16 may be located in the reactor 17, or outside of the reactor 17, such as, e.g., in the effluent. The sensors 15, 16 may include one or more probes in the reactor 17 and/or in the effluent. The plurality of sensors 15, 16 may include a dissolved oxygen (DO) sensor, a specific conductivity (SC) sensor, an ammonium concentration sensor (NH4, shown in FIG. 6) and/or a pH sensor (pH, shown in FIG. 12).

The DO sensor 15 may be configured to measure the dissolved oxygen in the mixture in the reactor 17 (and/or effluent) and provide a DO measurement signal to the controller 13 over a communication link 9.

The SC sensor 16 may be configured to measure the specific conductivity of the mixture in the reactor 17 (and/or effluent) and provide an SC measurement signal to the controller 13 over the communication link 9.

The NH4 sensor 21 (shown in FIGS. 6, 7) may be configured to measure the ammonium concentration in the reactor 17 (and/or effluent) and provide an ammonium concentration (AC) measurement signal to the controller 13 over the communication link 9.

The pH sensor 22 (shown in FIGS. 11, 12) may be configured to measure the pH in the reactor 17 (and/or effluent) and provide pH measurement signal to the controller 13 over the communication link 9.

The alkalinity sensor 23 (shown in FIGS. 20, 21) may be configured to measure the alkalinity in the reactor 17 (and/or effluent) and provide alkalinity measurement signal to the controller 13 over the communication link 9.

As seen in FIG. 1, the diffuser(s) 14 may be located in the reactor 17, and materials, such as, e.g., plastic biofilm carrier(s) 12, may be kept in suspension in the reactor 17 by continuous aeration provided by the diffusers 14. The influent flow to the reactor 17 may be equal to the effluent flow and the reactor 17 may be completely mixed. While all of the sensors 15, 16, 21, 22, 23 may be implemented simultaneously in the control system 100 (100', 100'', 100''', 100'''', 100''''', 100'''''', 100'''''''), the following description provides examples of the control system 100 with two sensors, with an understanding that more than two sensors may be used.

Figure 3:
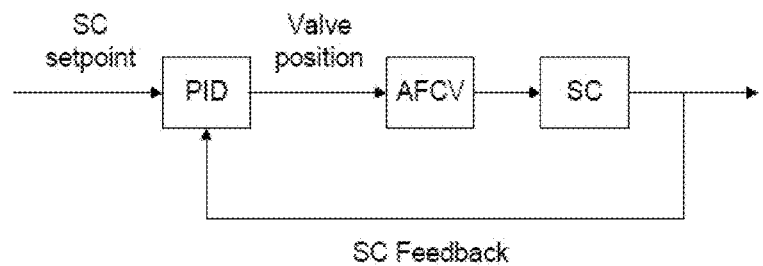
FIG. 3 shows an example of a method of controlling a gas valve position or a blower output based on a specific conductivity, according to the principles of the disclosure.
Figure 4:
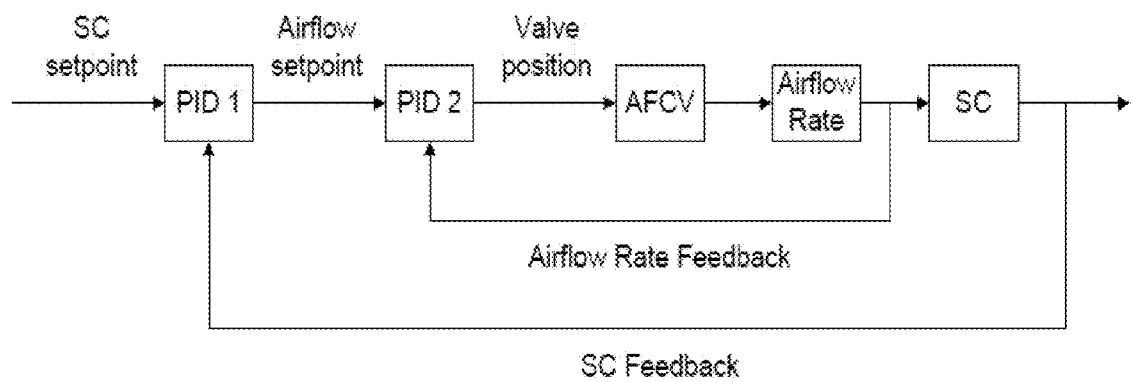
FIG. 4 shows an example of a method controlling a gas flow rate setpoint based on specific conductivity, wherein the gas flow rate setpoint controls a valve position or a blower output, according to the principles of the disclosure.
Figure 5:
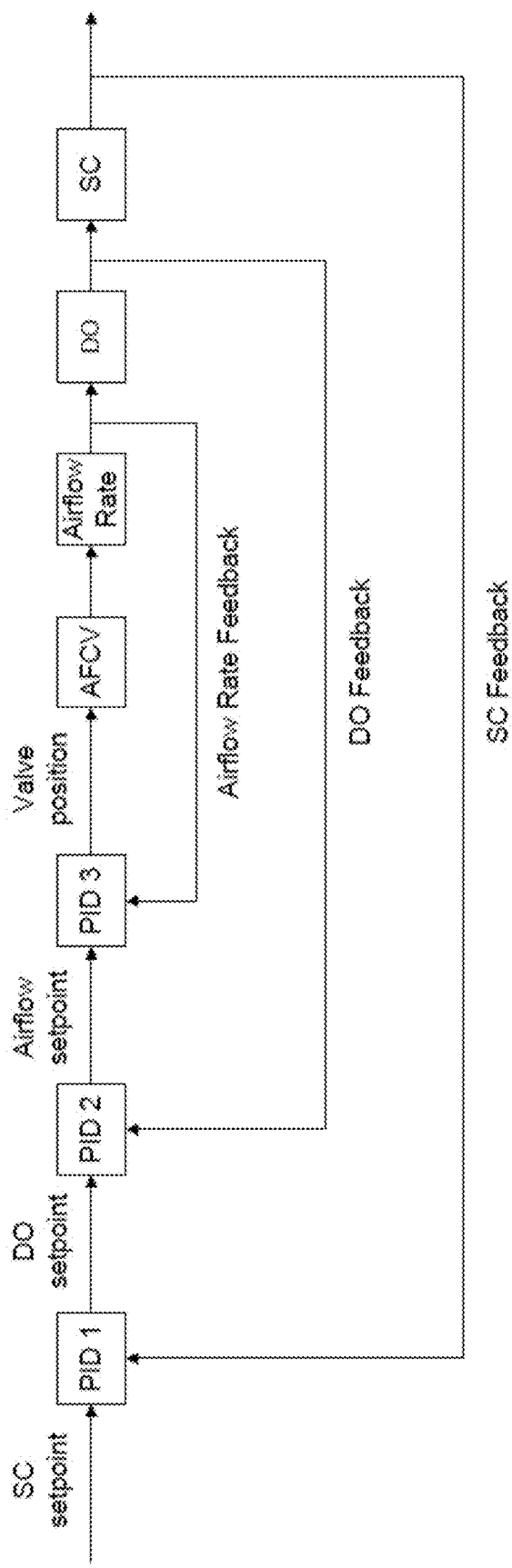
FIG. 5 shows an example of a method of controlling a DO setpoint based on specific conductivity, wherein the DO setpoint controls a gas flow rate setpoint that controls a gas flow valve position or a blower output, according to the principles of the disclosure.
Figure 6:
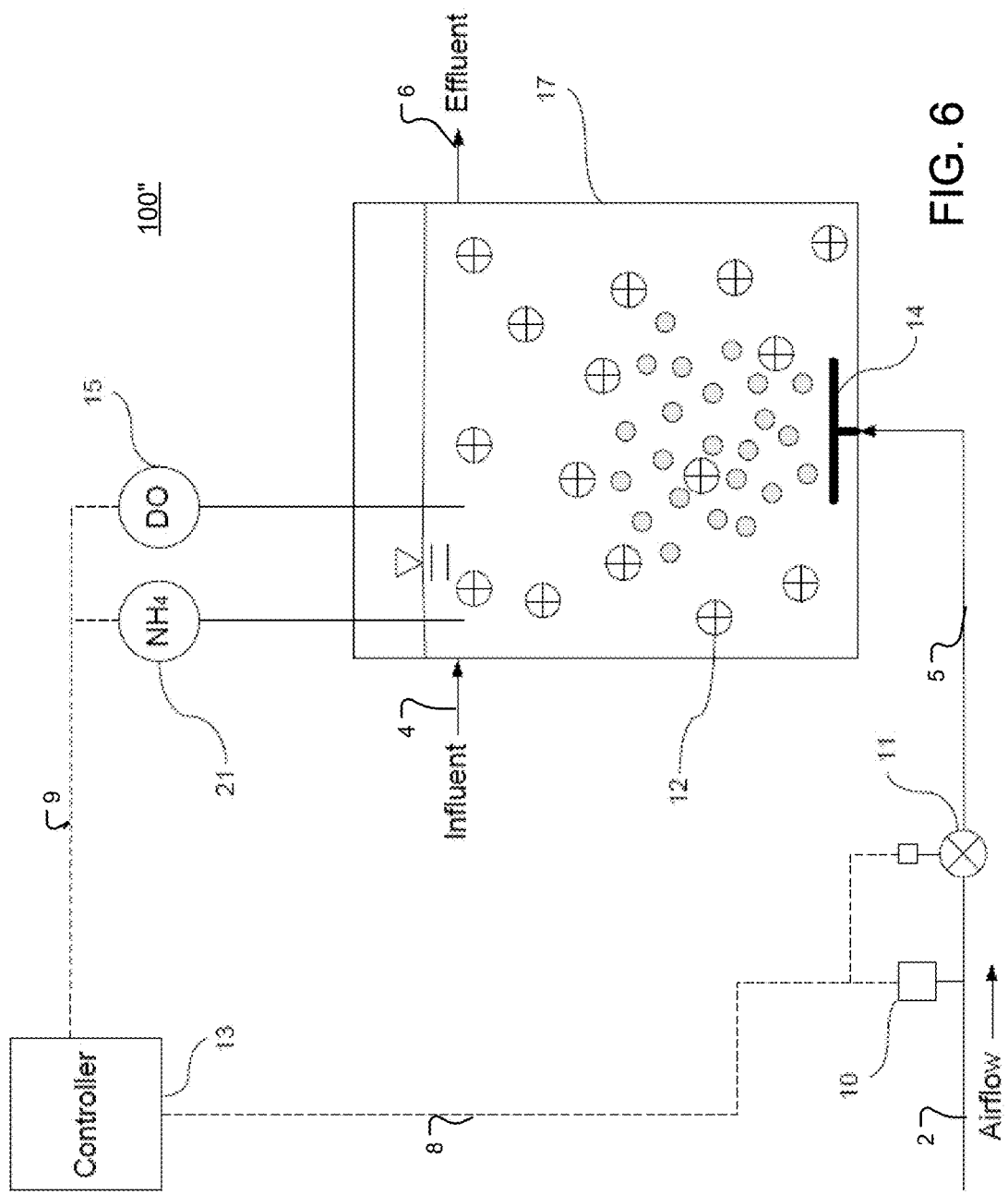
FIG. 6 shows a cross-sectional view of an example of an ammonium concentration ("AC") control system for controlling treating ammonium containing water in a deammonification MBBR process in which partial nitritation and anaerobic ammonium oxidation occur simultaneously, constructed according to the principles of the disclosure.
Figure 8:
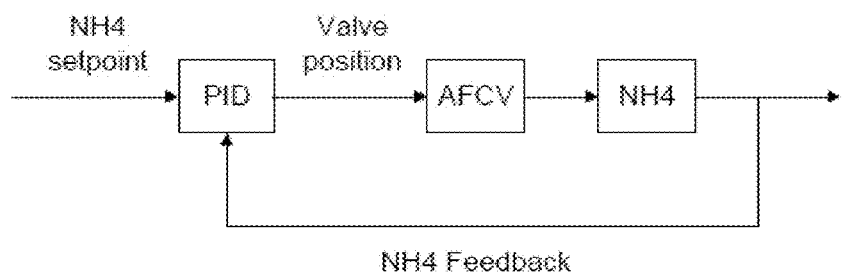
FIG. 8 shows an example of a method of controlling a gas valve position or a blower output based on an ammonium concentration, according to the principles of the disclosure.
Figure 9:
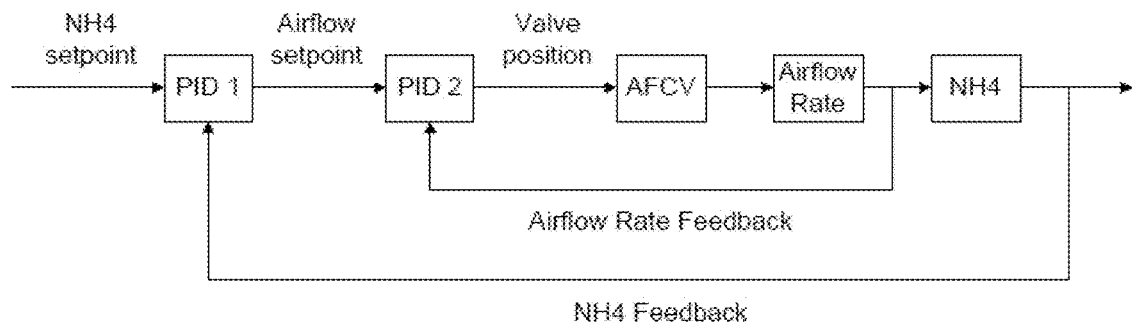
FIG. 9 shows an example of a method controlling a gas flow rate setpoint based on ammonium concentration, wherein the gas flow rate setpoint controls a valve position or a blower output, according to the principles of the disclosure.
Figure 10:
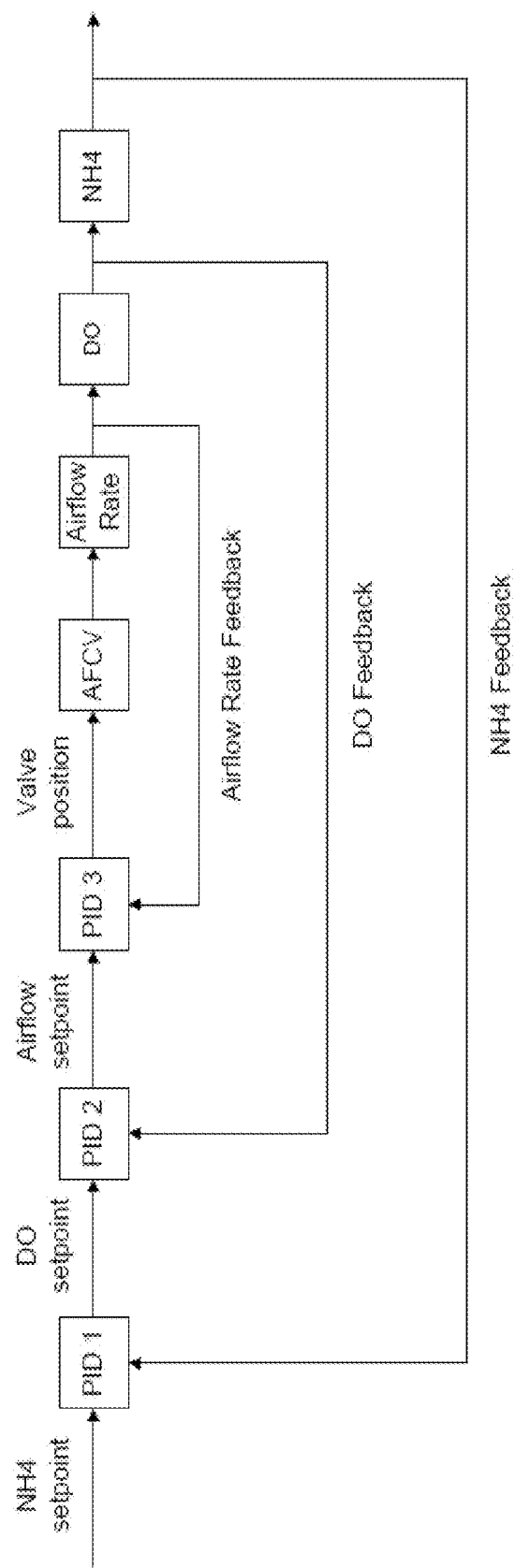
FIG. 10 shows an example of a method of controlling a DO setpoint based on ammonium concentration, wherein the DO setpoint controls a gas flow rate setpoint that controls a gas valve position or a blower output, according to the principles of the disclosure.
Figure 11:
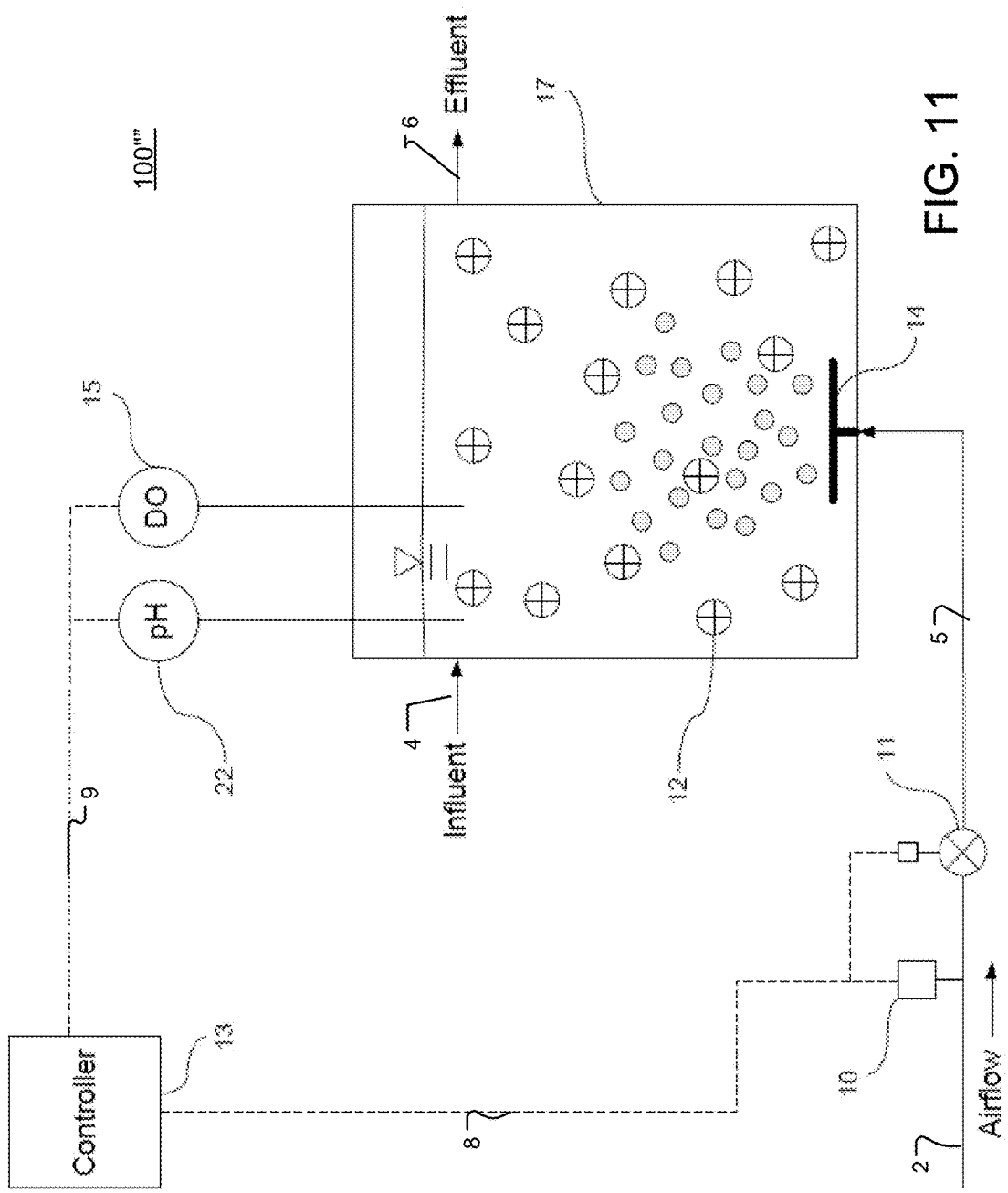
FIG. 11 shows a cross-sectional view of an example of a pH-based control system for controlling treating ammonium containing water in a deammonification MBBR process in which partial nitration and anaerobic ammonium oxidation occur simultaneously, constructed according to the principles of the disclosure.
Figure 13:
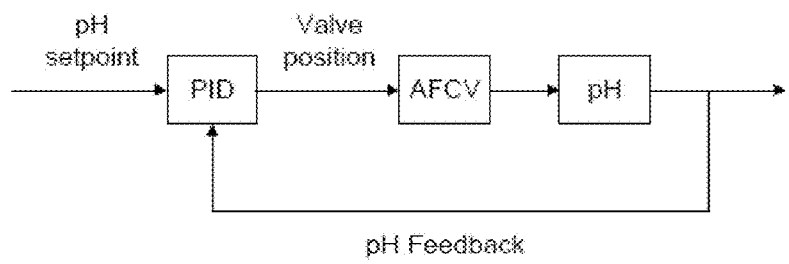
FIG. 13 shows an example of a method of controlling a gas valve position or a blower output based on pH, according to the principles of the disclosure.
Figure 14:
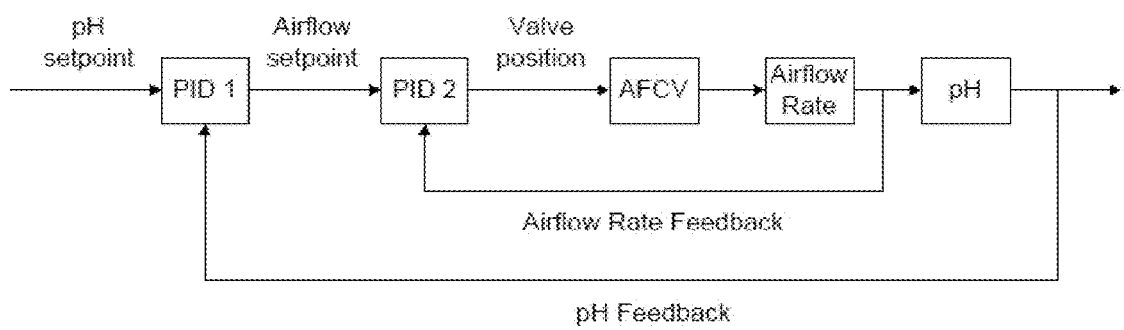
FIG. 14 shows an example of a method controlling a gas flow rate setpoint based on pH, wherein the gas flow rate setpoint controls a valve position or a blower output, according to the principles of the disclosure.
Figure 15:
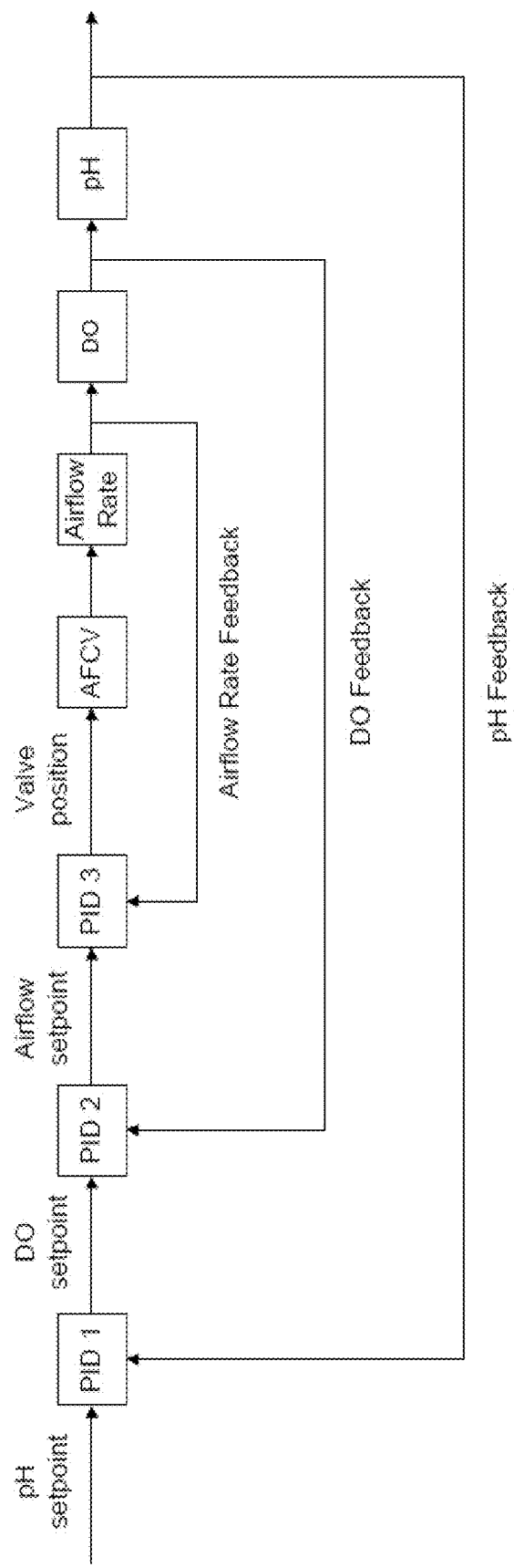
FIG. 15 shows an example of a method of controlling a DO setpoint based on pH, wherein the DO setpoint controls a gas flow rate setpoint that controls a valve position or a blower output, according to the principles of the disclosure.
Figure 22:
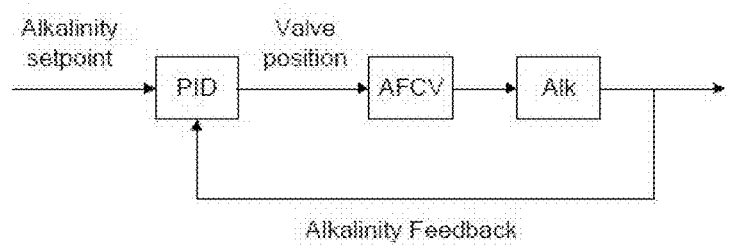
FIG. 22 shows an example of a method of controlling a gas valve position or a blower output based on alkalinity, according to the principles of the disclosure.
Figure 23:
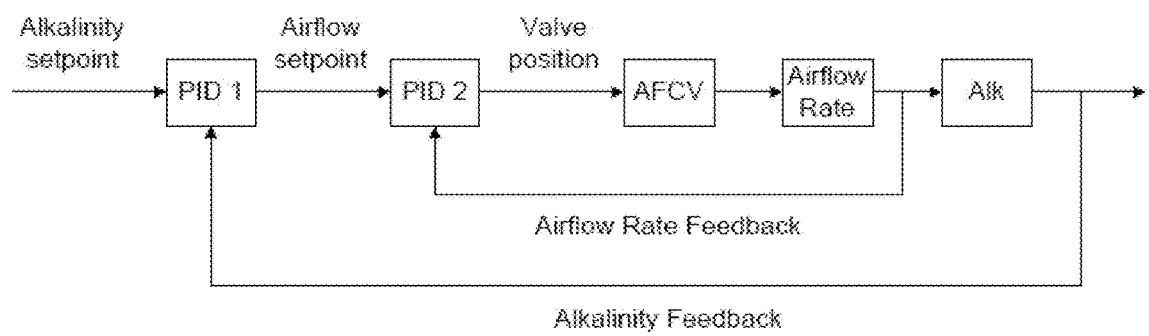
FIG. 23 shows an example of a method controlling a gas flow rate setpoint based on alkalinity, wherein the gas flow rate setpoint controls a valve position or a blower output, according to the principles of the disclosure.
Figure 24:
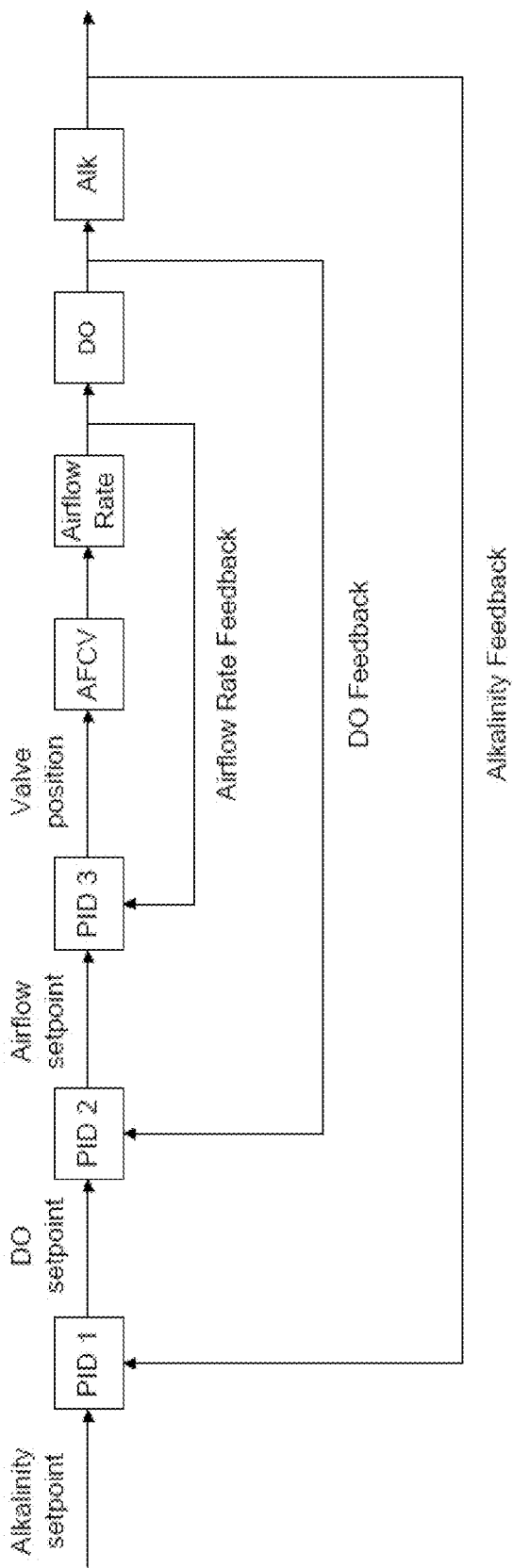
FIG. 24 shows an example of a method of controlling a DO setpoint based on alkalinity, wherein the DO setpoint controls a gas flow rate setpoint that controls a valve position or a blower output, according to the principles of the disclosure.

Referring to FIGS. 1, 6, and 11, the gas flow meter 10 may provide gas flow rate feedback to the controller 13 in the gas flow measurement signal supplied on communication link 8; the SC measurement signal from the specific conductivity sensor 16 may provide feedback for any of the disclosed specific conductivity aeration control methods described in FIGS. 3-5, with the option of using the DO measurement signal from the DO sensor 15 for control; the AC measurement signal from the ammonium sensor 21 may provide feedback for any of the disclosed ammonium aeration control methods described in FIGS. 8-10, with the option of using the DO measurement signal from the DO sensor 15 for control; the pH measurement signal from the pH sensor 22 may provide feedback for any of the disclosed pH aeration control methods described in FIGS. 13-15, with the option of using the signal from the DO sensor 15 for control; and the alkalinity measurement signal from the alkalinity sensor 23 may provide feedback for any of the disclosed alkalinity aeration control methods described in FIGS. 22-24, with the option of using the signal from the DO sensor 15 for control.

The control system 100 (100', 100'', 100''', 100'''', 100''''', 100'''''', 100'''''''), individually or collectively referred to as 100) includes controlling gas (e.g. airflow, oxygen flow, etc.) to the reactor 17 to achieve a target pH, a target alkalinity, a target specific conductivity, or a target ammonium concentration in the reactor 17 or in the effluent. In a deammonification MBBR, the ammonium concentration in the effluent corresponds to a given pH, alkalinity and/or specific conductivity, so the plurality of signals (e.g., four signals) can be used interchangeably.

The system 100 maintains a constant pH (e.g., alkalinity, ammonium and specific conductivity) in the effluent to maintain near-complete use of influent alkalinity and the lowest possible ammonium concentration in the effluent. (In an embodiment of the disclosure, pH, alkalinity and SC can be used interchangeably.) It is difficult to achieve this using DO control alone due to changes in influent ammonium concentration and alkalinity and changes in oxygen demand in the reactor. By controlling aeration based on pH, alkalinity, or specific conductivity, the alkalinity consumed in the reactor may be set equal to the alkalinity in the influent, less the need to maintain some residual in the process effluent of about 25 to 300 mg/L as $CaCO_3$, avoiding the possibility of drastic reductions in pH due to depletion of alkalinity. The system 100 may control gas flow based on pH, alkalinity, ammonium concentration, and/or specific conductivity, resulting in more consistent effluent characteristics with little or no operator input. The system 100 avoids problems associated with ammonium being removed to levels that result in AOB or anammox activity limitations, and the subsequent induction of NOB growth. The use of, for example, pH and/or specific conductivity probes in the system 100 provides the advantage of using a robust sensor for control.

In each of a plurality of control modes described herein, the pH, alkalinity, specific conductivity, or ammonium concentration setpoint(s) may be used to control the gas flow control valve 11 position directly, control the air flow setpoint which controls the gas flow control valve 11 position, or control the dissolved oxygen setpoint which controls the gas flow setpoint which controls the gas flow control valve 11 position (cascade control). The control is accomplished by means of the controller 13, which includes a computer that may include an appropriately tuned proportional, proportional-integral, proportional-integral-derivative, or logic-based process (or algorithm).

If NOB growth does occur, resulting in an increase in effluent nitrate, the controller 13 may decrease gas flow rate to the reactor 17 by increasing the pH, alkalinity, specific conductivity, or ammonium concentration setpoints until the nitrate production ratio is less than the value that would be expected to be produced by AMX alone (e.g., 10-15%). The controller may control the pH, alkalinity, specific conductivity or ammonium concentration setpoints to achieve optimal NO3 production ratio values. The controller 13 may measure the influent and effluent ammonium concentrations, and, based on the effluent and influent nitrate concentrations, determine the nitrate production ratio according to the following equation:

$$NO_3 \text{ production ratio} = \frac{\text{Effluent } NO_3 - \text{Influent } NO_3}{\text{Influent } NH_4 - \text{Effluent } NH_4} \times 100 \quad \text{(Equation 1)}$$

Figure 2:
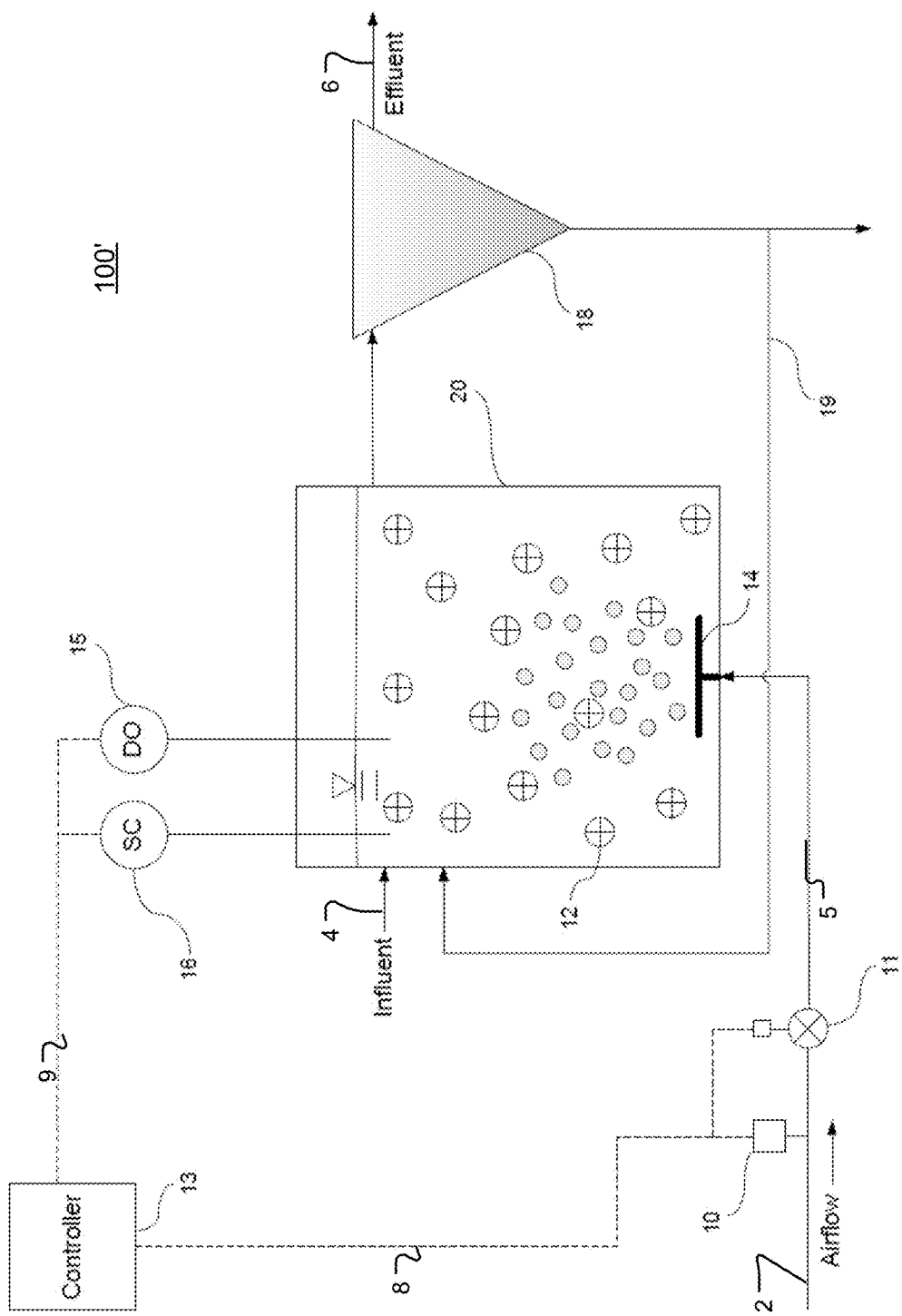
FIG. 2 shows a cross-sectional view of an example of an expanded SC control system, constructed according to the principles of the disclosure.

FIG. 2 shows a cross-sectional view of an example of an expanded SC control system 100', constructed according to the principles of the disclosure. The expanded SC control system 100' includes an integrated fixed film activated sludge (IFAS) reactor 20 with the diffusers 14, meter 10, valve 11, specific conductivity sensor 16, DO sensor 15, clarifier 18 and return activated sludge 19. A material (or biofilm carriers) 12 may be kept in suspension by continuous aeration provided by the diffusers 14. The material may include a carrier made of plastic, metal, ceramic, or any other material that may be suitable for the application. The IFAS configuration may include biomass suspended in the mixed liquor as well as biomass on the biofilm carriers 12. The influent flow to the reactor may be equal to the effluent flow and the reactor may be completely mixed. Sensors 16 and 15 may be located in the reactor 20 or in the effluent. Gas flow to the reactor 20 may be determined by the valve 11 but may also be determined by varying the output of a blower or compressor. The meter 10 may be located upstream of the control valve 11 and configured to provide a gas flow rate feedback (or gas flow measurement signal) to the controller 13. An SC measurement signal from the specific conductivity sensor 16 may provide feedback for any of the disclosed specific conductivity aeration control methods described in FIGS. 3-5, with the option of using the signal from the DO sensor 15 for control.

FIG. 3 shows an example of a method of controlling a gas valve position or a blower output based on a specific conductivity, according to the principles of the disclosure. If the specific conductivity feedback (SC measurement signal) is less than the specific conductivity setpoint, a proportional-integrated-derivative ("PID") controller may decrease the control valve position or blower output to decrease the volume/rate of gas supplied to the reactor 20 (or 17). If the specific conductivity feedback is greater than the specific conductivity setpoint, the PID controller increases the control valve position or blower output to increase the volume/rate of gas supplied to the reactor 20 (or 17). The PID controller may include, e.g., a scalar PID, a multivariable PID ("MPID"), or the like.

The PID controller may operate according to, e.g., the following algorithm, where u(t) is the PID controller output and MV is the manipulated variable:

$$u(t) = MV(t) = K_p e(t) + K_i \int_0^t e(\tau)d\tau + K_d \frac{d}{dt}e(t) \quad \text{(Equation 2)}$$

where $K_p$ is the proportional gain, $K_i$ is the integral gain, $K_d$ is the derivative gain, SP is the desired variable value, PV is the measured variable value, e is the error=SP−PV, t is the time, and is the variable integration from 0 to t.

The PID controller may be located in the controller 13.

The controller 13 may include a PID, a tuned-proportional, a proportional-integral, a logic-based, or the like, tuning process. The controller 13 may be configured to adjust control parameters (such as, e.g., proportional band/gain, integral band/reset, derivative gain/rate, or the like) to obtain optimal performance of the processes in the MBBR and/or IFAS systems.

FIG. 4 shows an example of a method controlling a gas flow rate setpoint based on specific conductivity, wherein the gas flow rate setpoint controls a valve position or a blower output, according to the principles of the disclosure. In this example, the PID controller may include a plurality (e.g., two) PID controllers in cascade. If the specific conductivity feedback is less than the specific conductivity setpoint, then the first PID 1 controller decreases the gas flow rate setpoint and the second PID 2 controller decreases the gas flow control valve position or blower output, thereby reducing the volume/rate of gas supplied to the reactor 20 (or 17). If the specific conductivity feedback is greater than the specific conductivity setpoint, then the PID 1 controller increases the gas flow rate setpoint and the PID 2 controller increases the gas flow control valve position or blower output to increase the volume/rate of gas supplied to the reactor.

FIG. 5 shows an example of a method of controlling a DO setpoint based on specific conductivity, wherein the DO setpoint controls a gas flow rate setpoint that controls a gas valve position or a blower output, according to the principles of the disclosure. In this example, the PID controller may include, e.g., three PID controllers in cascade. If the specific conductivity feedback is less than the specific conductivity setpoint, then the first PID 1 controller decreases the DO setpoint, the second PID 2 controller decreases the gas flow rate setpoint, and a third PID 3 controller decreases the gas flow control valve position or blower output to reduce the volume/rate of gas supplied to the reactor. If the specific conductivity feedback is greater than the specific conductivity setpoint, then the PID 1 controller increases the DO setpoint, the PID 2 controller increases the gas flow rate setpoint, and the PID 3 controller increases the gas flow control valve position or blower output to increase the volume/rate of gas supplied to the reactor.

FIG. 6 shows a cross-sectional view of an example of an ammonium concentration (AC) control system 100" for treating ammonium containing water in a deammonification MBBR process in which partial nitritation and anaerobic ammonium oxidation occur simultaneously, constructed according to the principles of the disclosure. The system 100" comprises the reactor 17 with the diffusers 14, meter 10, control valve 11, ammonium sensor 21, and DO sensor 15. Biofilm carriers 12 may be kept in suspension by continuous aeration provided by the diffusers 14. The influent flow to the reactor may be equal to the effluent flow and the reactor may be completely mixed. Sensors 21 and 15 may be located in the reactor or in the effluent. Gas (e.g., air) flow to the rector may be determined by the control valve 11. The meter 10 may be located upstream of the control valve 11 and configured to provide gas flow rate feedback (gas flow measurement signal) to the controller 13. An AC measurement signal from the ammonium sensor 21 may provide feedback for any of the disclosed ammonium aeration control methods described in FIGS. 8-10, with the option of using the DO measurement signal from the DO sensor 15 for control.

Figure 7:
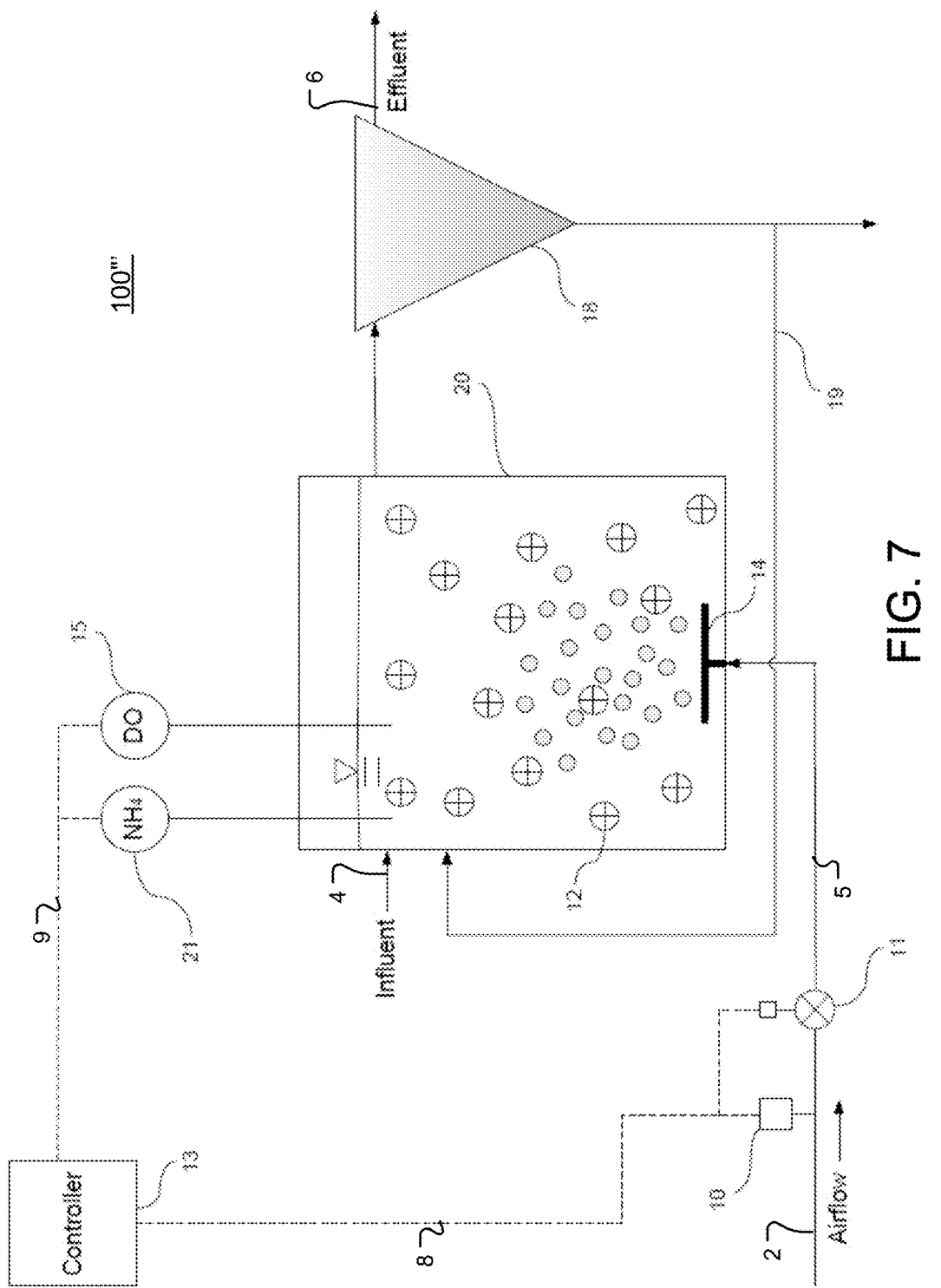
FIG. 7 shows a cross-sectional view of an example of an expanded AC control system, constructed according to the principles of the disclosure.

FIG. 7 shows a cross-sectional view of an example of an expanded AC control system 100''', constructed according to the principles of the disclosure. The system 100''' includes the IFAS reactor 20 with the diffusers 14, meter 10, control valve 11, ammonium sensor 21, DO sensor 15, clarifier 18 and return activated sludge 19. Biofilm carriers 12 may be kept in suspension by continuous aeration provided by the diffusers 14. The IFAS configuration may include biomass suspended in the mixed liquor as well as biomass on the biofilm carriers 12. The influent flow to the reactor may be equal to the effluent flow and the reactor may be completely mixed. Sensors 21 and 15 may be located in the reactor or in the effluent. Gas flow to the rector may be determined by the modulating control valve 11. The meter 10 may be located upstream of the control valve 11 and configured to provide gas flow rate feedback to the controller 13. A signal from the ammonium sensor 21 may provide feedback for any of the disclosed ammonium aeration control methods described in FIGS. 8-10, with the option of using the signal from the DO sensor 15 for control.

FIG. 8 shows an example of a method of controlling a valve position or a blower output based on an ammonium concentration, according to the principles of the disclosure. If the ammonium concentration feedback is less than the ammonium concentration setpoint, then the PID controller decreases the control valve position or blower output to reduce the volume/rate of gas supplied to the reactor. If the ammonium concentration feedback is greater than the ammonium concentration setpoint, then the PID controller increases the control valve position or blower output to increase the volume/rate of gas supplied to the reactor.

FIG. 9 shows an example of a method controlling a gas flow rate setpoint based on ammonium concentration, wherein the gas flow rate setpoint controls a valve position or a blower output, according to the principles of the disclosure. If the ammonium concentration feedback is less than the ammonium concentration setpoint, then the PID 1 controller decreases the gas flow rate setpoint and the PID 2 controller decreases the gas flow control valve position or blower output, thereby reducing the volume/rate of gas supplied to the reactor. If the ammonium concentration feedback is greater than the ammonium concentration setpoint, then the PID 1 controller increases the gas flow rate setpoint and the PID 2 controller increases the gas flow control valve position or blower output to increase the volume/rate of gas supplied to the reactor.

FIG. 10 shows an example of a method of controlling a DO setpoint based on ammonium concentration, wherein the DO setpoint controls a gas flow rate setpoint that controls a control valve position or a blower output, according to the principles of the disclosure. If ammonium concentration feedback is less than the ammonium concentration setpoint, then the PID 1 controller decreases the DO setpoint, the PID 2 controller decreases the gas flow rate setpoint, and the PID 3 controller decreases the gas flow control valve position or blower output, thereby reducing the volume/rate of gas supplied to the reactor. If the ammonium concentration feedback is greater than the ammonium concentration setpoint, then the PID 1 controller increases the DO setpoint, the PID 2 controller increases the gas flow rate setpoint, and the PID 3 controller increases the control valve position or blower output, thereby increasing the volume/rate of gas supplied to the reactor.

FIG. 11 shows a cross-sectional view of an example of a pH-based control system 100'''' for treating ammonium containing water in a deammonification MBBR process in which partial nitritation and anaerobic ammonium oxidation occur simultaneously, constructed according to the principles of the disclosure. The system 100'''' comprises the reactor 17 with the air diffusers 14, meter 10, control valve 11, pH sensor 22, and DO sensor 15. Biofilm carriers 12 may be kept in suspension by continuous aeration provided by the diffusers 14. The influent flow to the reactor may be equal to the effluent flow and the reactor may be completely mixed. Sensors 22 and 15 may be located in the reactor or in the effluent. Gas flow to the reactor may be determined by the control valve 11. The meter 10 may be located upstream of the control valve 11 and configured to provide gas flow rate feedback to the controller 13. A signal from the pH sensor 22 may provide feedback for any of the disclosed pH aeration control methods described in FIGS. 13-15, with the option of using the signal from the DO sensor 15 for control.

Figure 12:
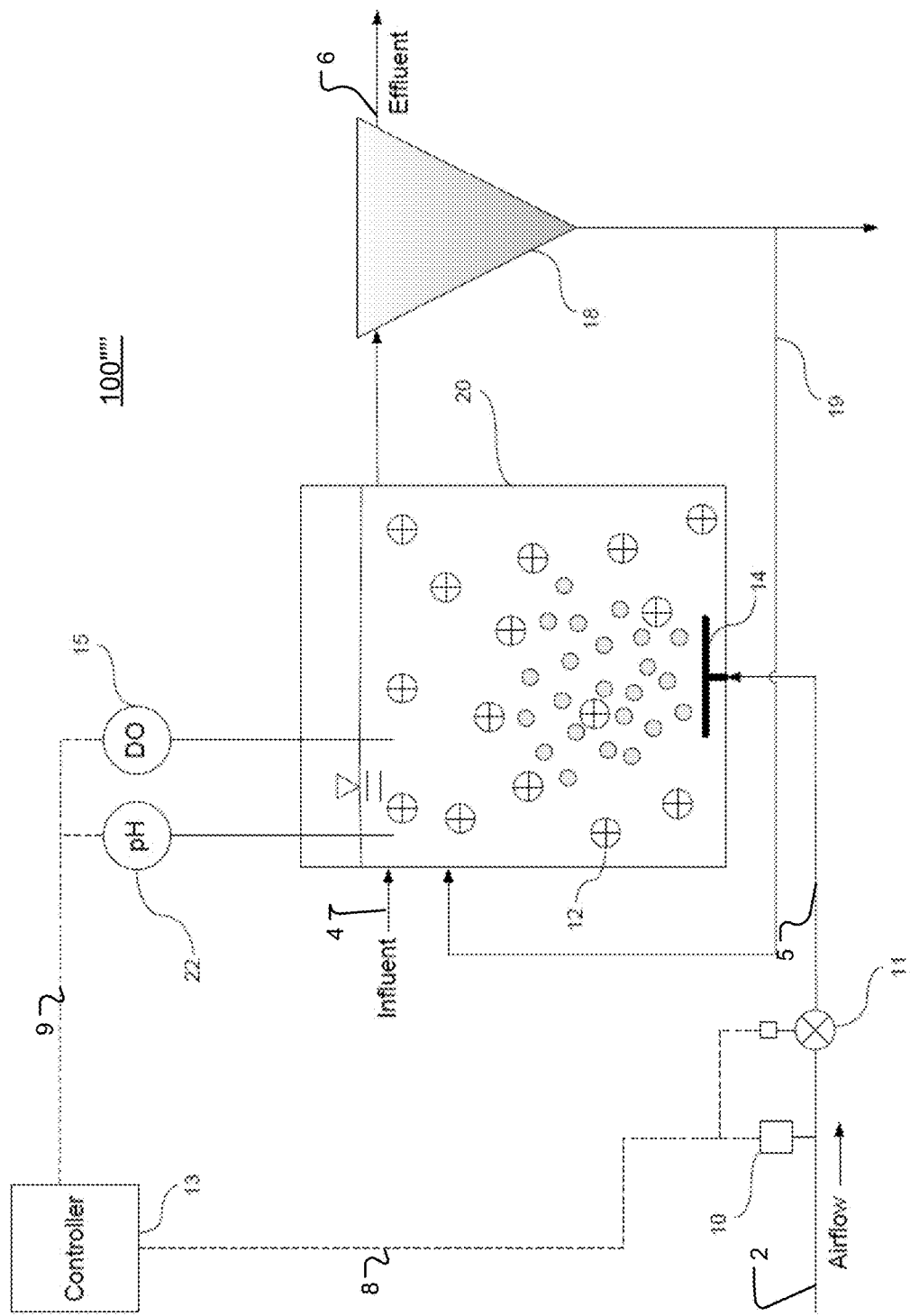
FIG. 12 shows a cross-sectional view of an example of an expanded pH-based control system, constructed according to the principles of the disclosure.

FIG. 12 shows a cross-sectional view of an example of an expanded pH-based control system 100''''', constructed according to the principles of the disclosure. The system 100''''' includes the IFAS reactor 20 with the diffusers 14, meter 10, control valve 11, pH sensor 22, DO sensor 15, clarifier 18 and return activated sludge 19. Biofilm carriers 12 may be kept in suspension by continuous aeration provided by the diffusers 14. The IFAS configuration includes biomass suspended in the mixed liquor as well as biomass on the biofilm carriers 12. The influent flow to the reactor may be equal to the effluent flow and the reactor may be completely mixed. Sensors 22 and 15 may be located in the reactor or in the effluent. Gas flow to the reactor may be determined by the control valve 11. The meter 10 may be located upstream of the control valve 11 and configured to provide gas flow rate feedback to the controller 13. A signal from the pH sensor 22 may provide feedback for any of the disclosed pH aeration control methods described in FIGS. 13-15, with the option of using the signal from the DO sensor 15 for control.

FIG. 13 shows an example of a method of controlling a gas valve position or a blower output based on pH, according to the principles of the disclosure. If the pH feedback is less than the pH setpoint, then the PID controller decreases the control valve position or blower output to decrease the volume/rate of gas supplied to the reactor. If the pH feedback is greater than the pH setpoint, then the PID controller increases the control valve position or blower output to increase the volume/rate of gas supplied to the reactor.

FIG. 14 shows an example of a method controlling a gas flow rate setpoint based on pH, wherein the gas flow rate setpoint controls a valve position or a blower output, according to the principles of the disclosure. If the pH feedback is less than the pH setpoint, then the PID 1 controller decreases the gas flow rate setpoint and the PID 2 controller decreases the control valve position or blower output to decrease the volume/rate of gas supplied to the reactor. If the pH feedback is greater than the pH setpoint, then the PID 1 controller increases the gas flow rate setpoint and the PID 2 controller increases the control valve position or blower output to increase the volume/rate of gas supplied to the reactor.

FIG. 15 shows an example of a method of controlling a DO setpoint based on pH, wherein the DO setpoint controls a gas flow rate setpoint that controls a valve position or a blower output, according to the principles of the disclosure. If pH feedback is less than the pH setpoint, then the PID 1 controller decreases the DO setpoint, the PID 2 controller decreases the gas flow rate setpoint, and the PID 3 controller decreases the control valve position or blower output to decrease the volume/rate of gas supplied to the reactor. If the pH feedback is greater than the pH setpoint, then the PID 1 controller increases the DO setpoint, the PID 2 controller increases the gas flow rate setpoint, and the PID 3 controller increases the control valve position or blower output to increase the volume/rate of gas supplied to the reactor.

Figure 16:
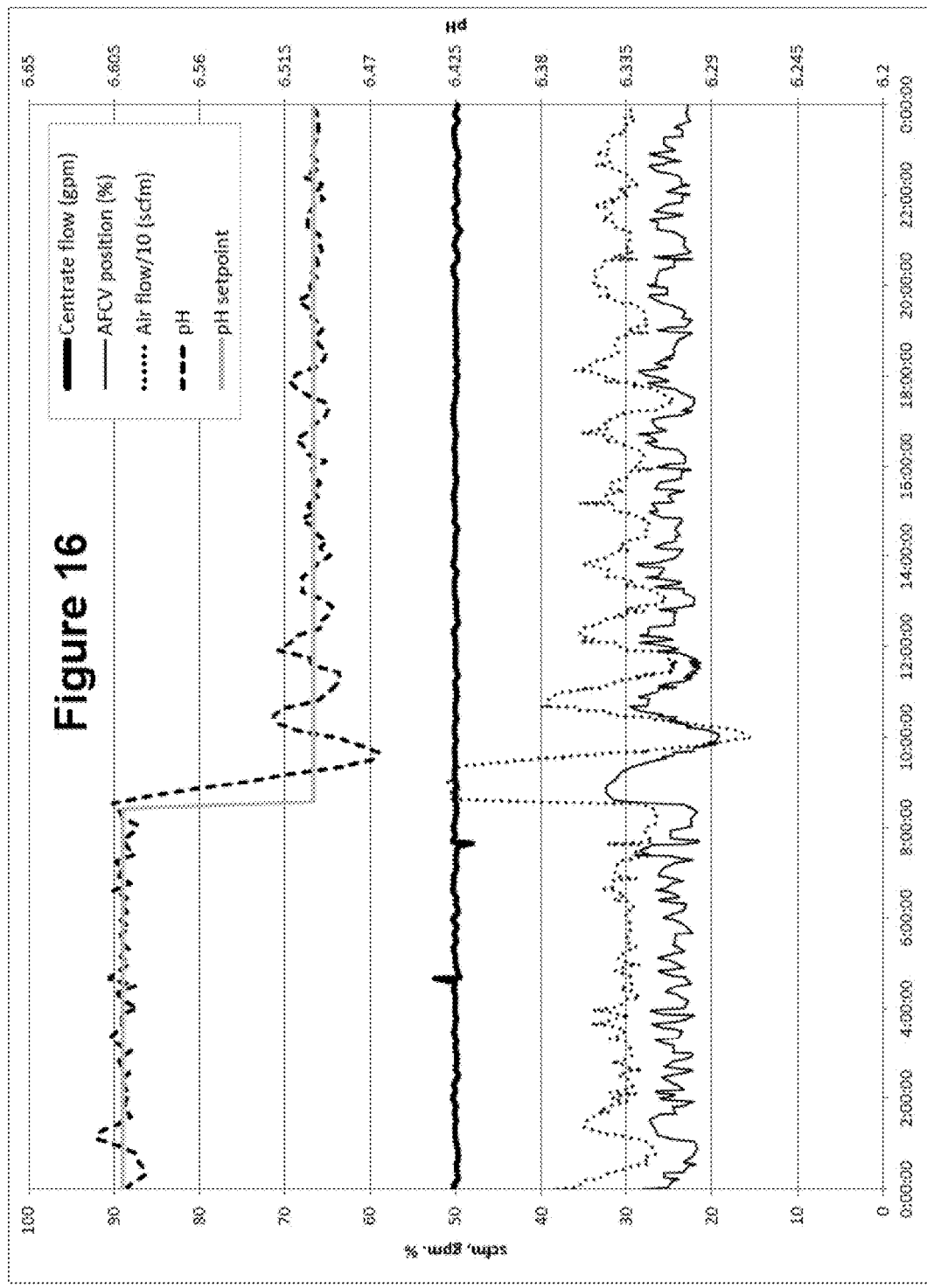
FIG. 16 is a diagram showing concentrate flow, AFCV position, gas flow, pH and pH setpoint for the method described in FIG. 14, wherein pH controls a gas flow rate setpoint which controls a valve position.

FIG. 16 is a diagram showing concentrate flow, AFCV position, gas flow, pH and pH setpoint for the method described in FIG. 14, wherein pH controls gas flow rate setpoint which controls gas valve position. The figure shows the response of the controller to a disturbance created by a change in pH setpoint. As seen, the controller adjusts the gas flow setpoint to meet the new pH setpoint.

Figure 17:
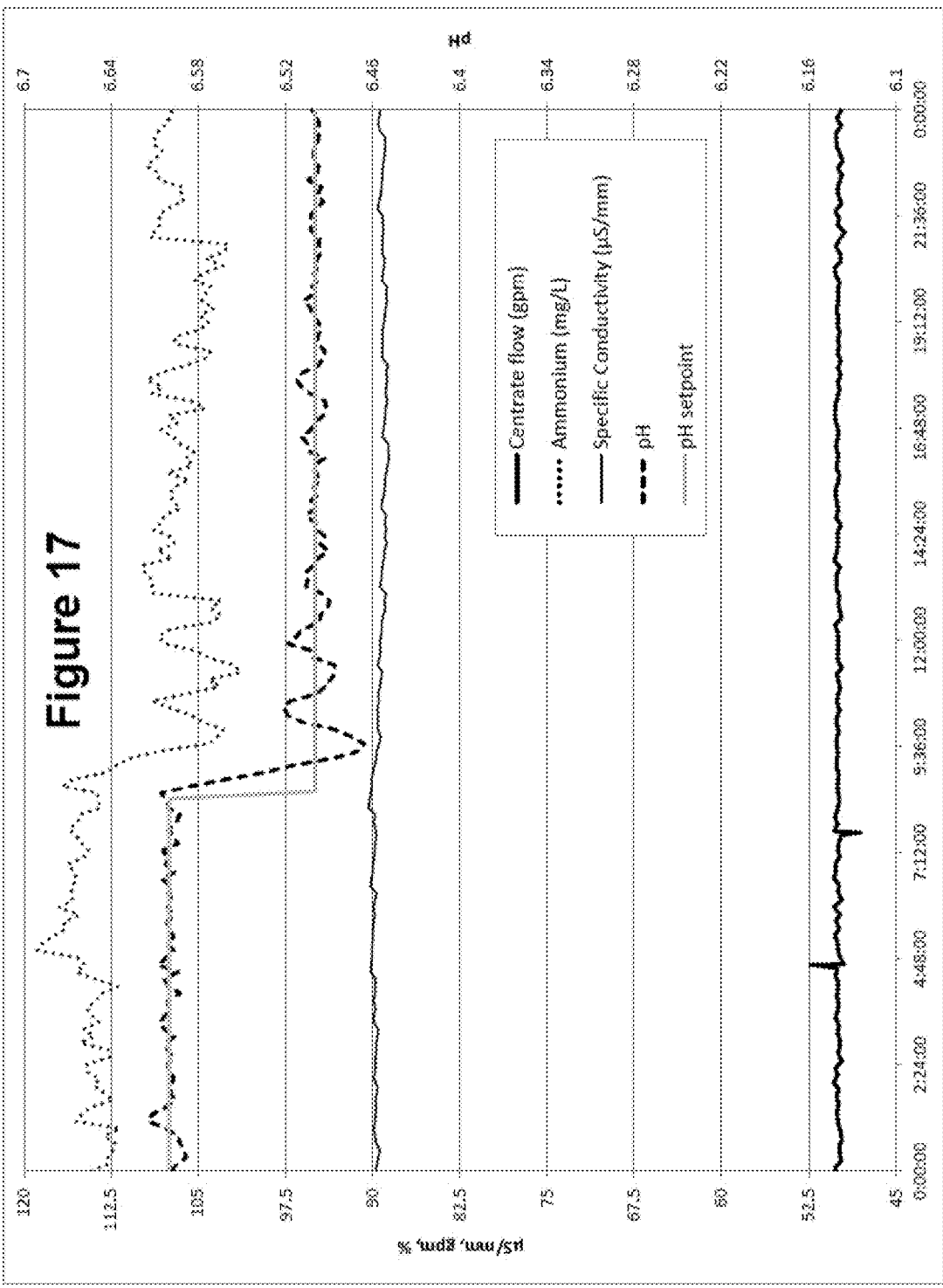
FIG. 17 is a diagram showing the pH, ammonium, and specific conductivity signals corresponding to one another and being used interchangeably to control aeration.

FIG. 17 shows that the pH, ammonium, and specific conductivity signals correspond to one another and can be used interchangeably to control aeration. When the pH in the reactor decreases to meet the pH setpoint, the ammonium concentration and specific conductivity decrease as well.

Figure 18:
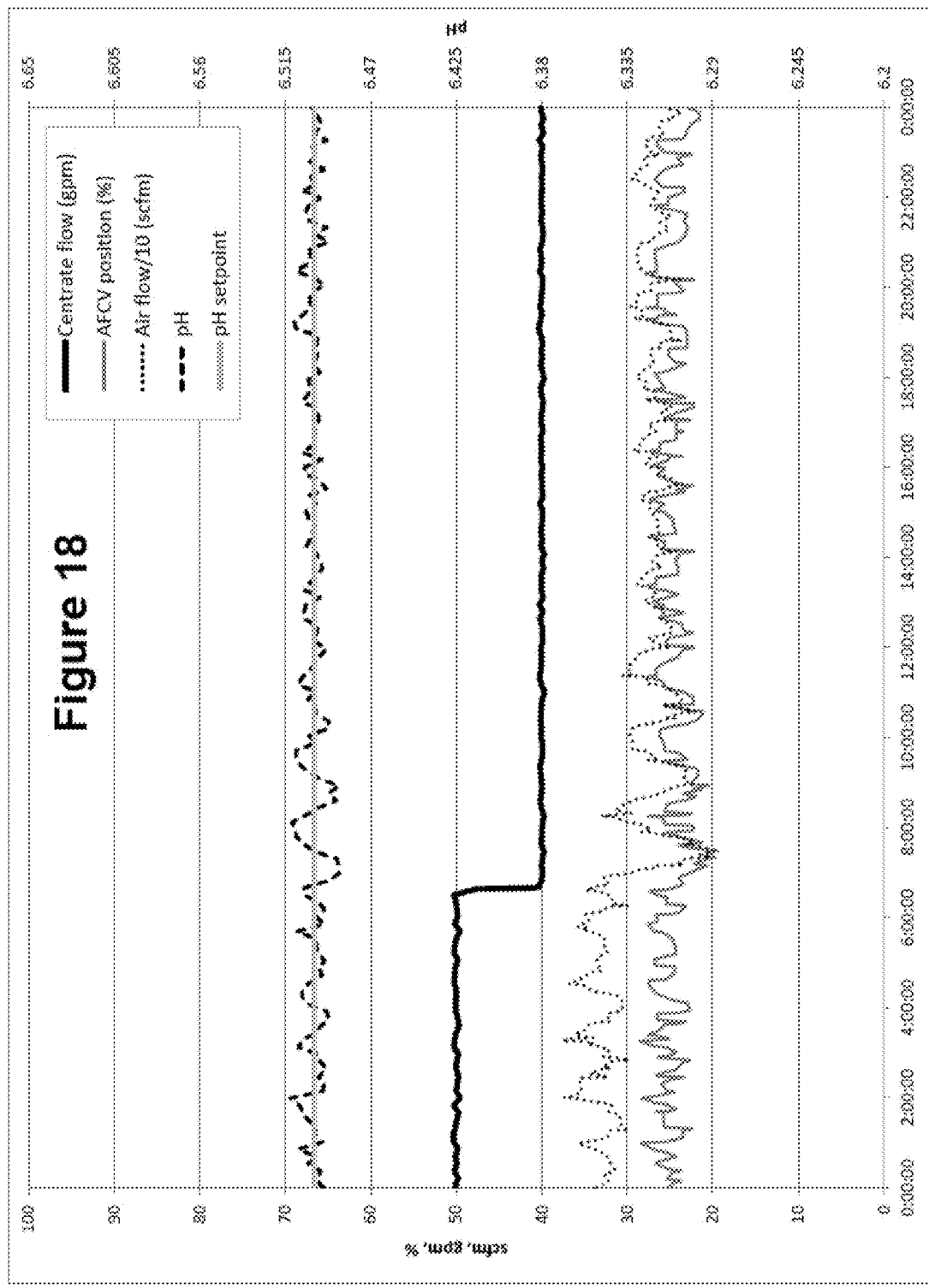
FIG. 18 is a diagram showing concentrate flow, AFCV position, gas flow, pH, and pH setpoint for the method described in FIG. 14, wherein pH controls gas flow rate setpoint which controls a valve position.

FIG. 18 shows an example of the method described in FIG. 14 wherein pH controls gas flow rate setpoint which controls gas valve position. The figure shows the response of the controller to a disturbance created by a change in the influent flow rate which corresponds to a change in influent ammonia and alkalinity loading. The controller adjusts the gas flow setpoint in order to maintain the pH setpoint.

Figure 19:
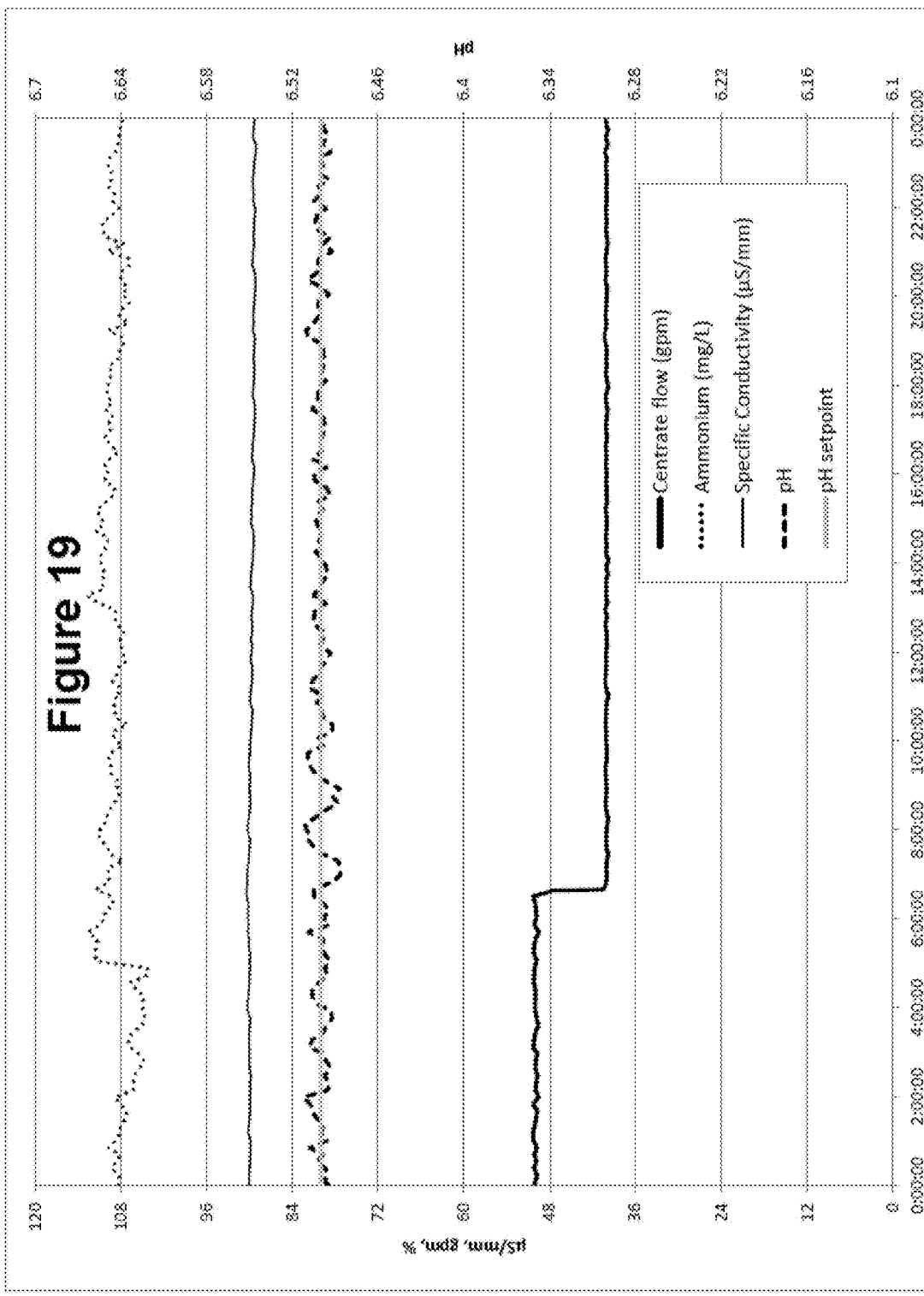
FIG. 19 is a diagram showing the pH, ammonium, and specific conductivity signals corresponding to one another and being used interchangeably to control aeration.

FIG. 19 shows that the pH, ammonium, and specific conductivity signals correspond to one another and can be used interchangeably to control aeration. When the influent flow rate decreases the pH controller decreases the gas flow to maintain the pH setpoint and the ammonium concentration and specific conductivity also stay constant.

Figure 20:
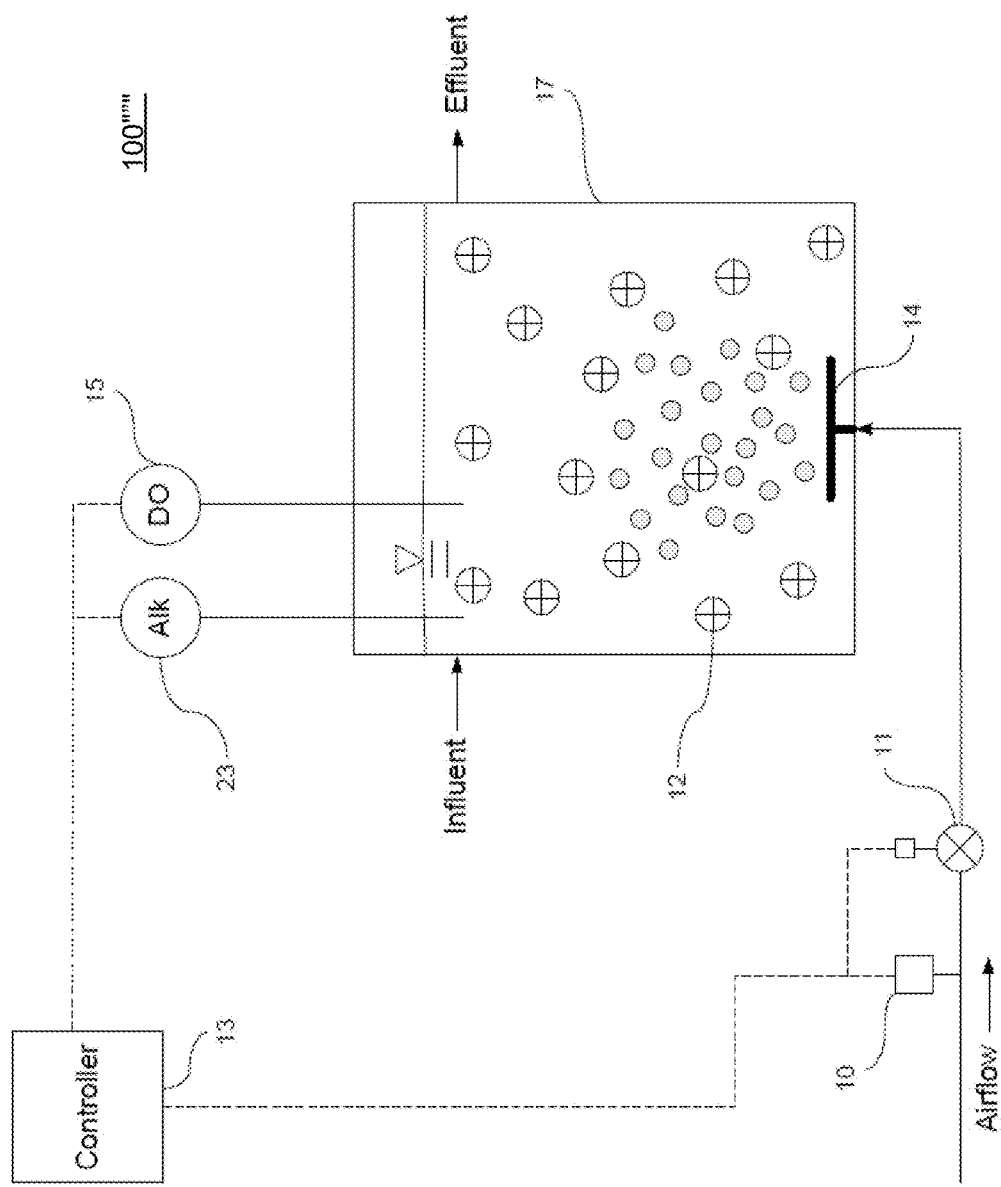
FIG. 20 shows a cross-sectional view of an example of an alkalinity-based control system for controlling treating ammonium containing water in a deammonification MBBR process in which partial nitration and anaerobic ammonium oxidation occur simultaneously, constructed according to the principles of the disclosure.

FIG. 20 shows a cross-sectional view of an example of an alkalinity-based control system 100""' for treating ammonium containing water in a deammonification MBBR process in which partial nitritation and anaerobic ammonium oxidation occur simultaneously, constructed according to the principles of the disclosure. The system 100""' comprises the reactor 17 with the air diffusers 14, meter 10, control valve 11, alkalinity sensor 23, and DO sensor 15. Biofilm carriers 12 may be kept in suspension by continuous aeration provided by the diffusers 14. The influent flow to the reactor may be equal to the effluent flow and the reactor may be completely mixed. Sensors 23 and 15 may be located in the reactor or in the effluent. Gas flow to the reactor may be determined by the control valve 11. The meter 10 may be located upstream of the control valve 11 and configured to provide gas flow rate feedback to the controller 13. A signal from the alkalinity sensor 23 may provide feedback for any of the disclosed alkalinity aeration control methods described in FIGS. 22-24, with the option of using the signal from the DO sensor 15 for control.

Figure 21:
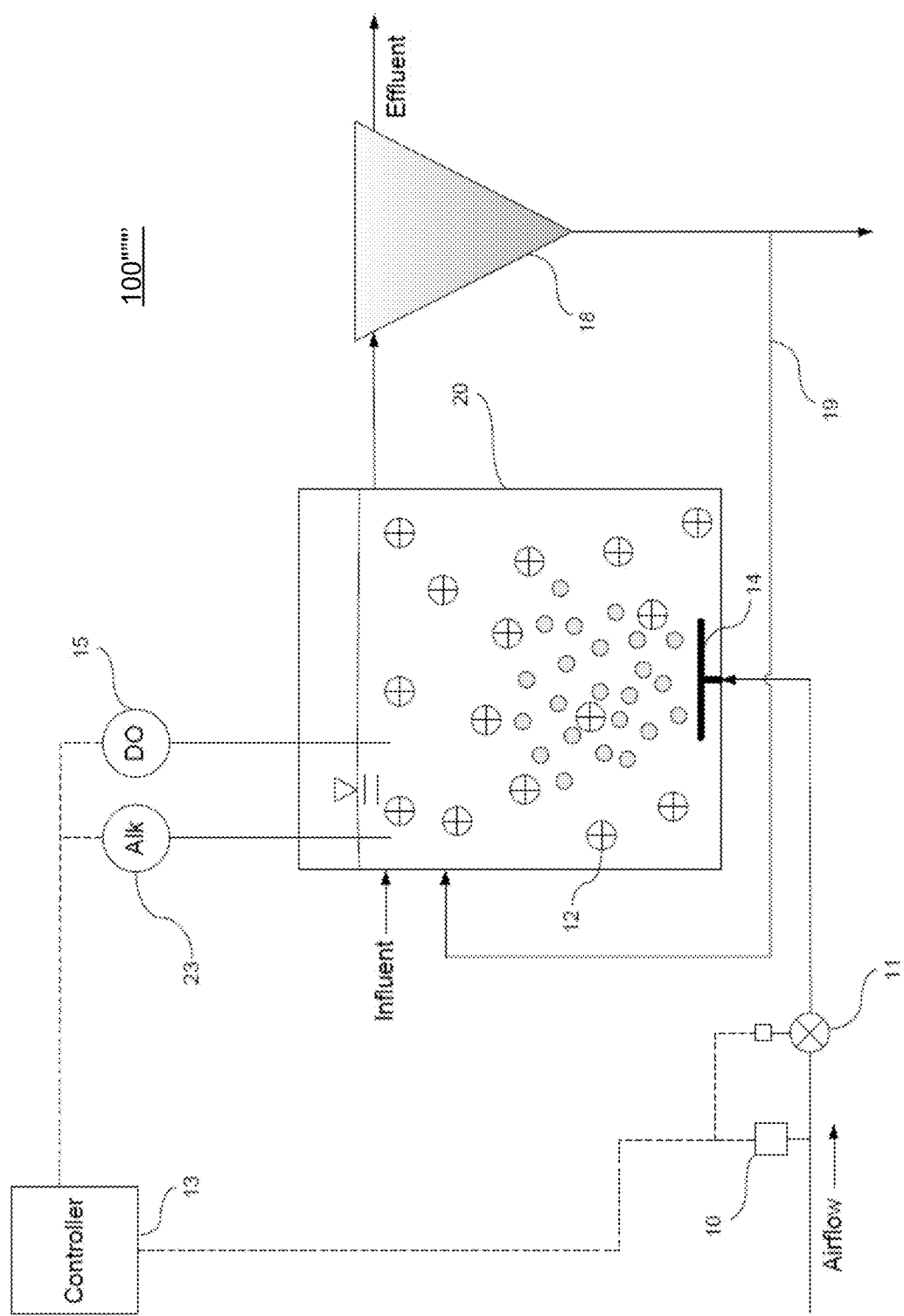
FIG. 21 shows a cross-sectional view of an example of an expanded alkalinity-based control system, constructed according to the principles of the disclosure.

FIG. 21 shows a cross-sectional view of an example of an expanded alkalinity-based control system 100""", constructed according to the principles of the disclosure. The system 100""" includes the IFAS reactor 20 with the diffusers 14, meter 10, control valve 11, alkalinity sensor 23, DO sensor 15, clarifier 18 and return activated sludge 19. Biofilm carriers 12 may be kept in suspension by continuous aeration provided by the diffusers 14. The IFAS configuration includes biomass suspended in the mixed liquor as well as biomass on the plastic biofilm carriers 12. The influent flow to the reactor may be equal to the effluent flow and the reactor may be completely mixed. Sensors 23 and 15 may be located in the reactor or in the effluent. Gas flow to the reactor may be determined by the control valve 11. The meter 10 may be located upstream of the control valve 11 and configured to provide gas flow rate feedback to the controller 13. A signal from the alkalinity sensor 23 may provide feedback for any of the disclosed alkalinity aeration control methods described in FIGS. 22-24, with the option of using the signal from the DO sensor 15 for control.

FIG. 22 shows an example of a method of controlling a gas valve position or a blower output based on alkalinity, according to the principles of the disclosure. If the alkalinity feedback is less than the alkalinity setpoint, then the PID controller decreases the control valve position or blower output to decrease the volume/rate of gas supplied to the reactor. If the alkalinity feedback is greater than the alkalinity setpoint, then the PID controller increases the control valve position or blower output to increase the volume/rate of gas supplied to the reactor.

FIG. 23 shows an example of a method controlling a gas flow rate setpoint based on alkalinity, wherein the gas flow rate setpoint controls a valve position or a blower output, according to the principles of the disclosure. If the alkalinity feedback is less than the alkalinity setpoint, then the PID 1 controller decreases the gas flow rate setpoint and the PID 2 controller decreases the control valve position or blower output to decrease the volume/rate of gas supplied to the reactor. If the alkalinity feedback is greater than the alkalinity setpoint, then the PID 1 controller increases the gas flow rate setpoint and the PID 2 controller increases the control valve position or blower output to increase the volume/rate of gas supplied to the reactor.

FIG. 24 shows an example of a method of controlling a DO setpoint based on alkalinity, wherein the DO setpoint controls a gas flow rate setpoint that controls a valve position or a blower output, according to the principles of the disclosure. If alkalinity feedback is less than the alkalinity setpoint, then the PID 1 controller decreases the DO setpoint, the PID 2 controller decreases the gas flow rate setpoint, and the PID 3 controller decreases the control valve position or blower output to decrease the volume/rate of gas supplied to the reactor. If the alkalinity feedback is greater than the alkalinity setpoint, then the PID 1 controller increases the DO setpoint, the PID 2 controller increases the gas flow rate setpoint, and the PID 3 controller increases the control valve position or blower output to increase the volume/rate of gas supplied to the reactor.

Figure 25:
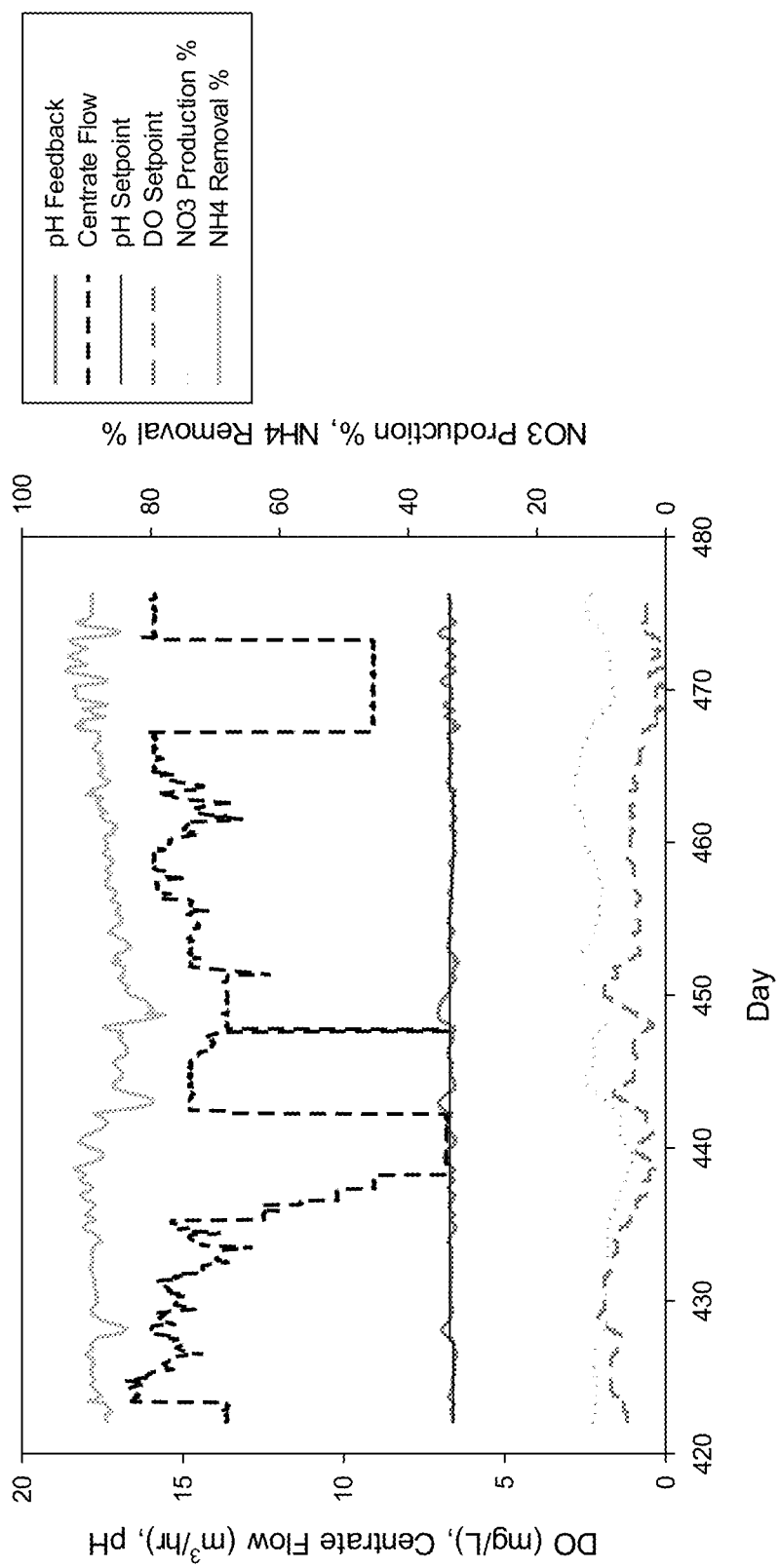
FIG. 25 shows an example of pH controlling DO setpoint, controlling airflow setpoint, controlling air flow control valve.

FIG. 25 shows an example of pH controlling DO setpoint, controlling airflow setpoint, controlling air flow control valve. Over the course of 2 months the controller changed the DO setpoint in response to disturbances caused by changes in centrate flow (aka influent ammonia and alkalinity load) while maintaining an ammonia removal rate in the range of 83-92%. Nitrate production remained below 15% and pH was maintained around the setpoint of 6.7.

The term "aeration" means the use of compressed air or purified oxygen or other gas mixture with the intent of transferring oxygen from the gas phase to the liquid phase. The terms "air" and "gas" mean any oxygen-containing gas that might be used.

The terms "including", "comprising" and variations thereof, as used in this disclosure, mean "including, but not limited to", unless expressly specified otherwise. The terms "a", "an", and "the", as used in this disclosure, means "one or more", unless expressly specified otherwise.

A "controller", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

We claim:

1. A method of treating ammonium containing water in a wastewater treatment site, the method comprising:
   receiving a plurality of sensor signals, the plurality of sensor signals comprising a dissolved oxygen level and at least one of a pH level, an alkalinity level, and a specific conductivity level; and
   controlling flow of a gas into the wastewater treatment site based on the dissolved oxygen level and said at least one of the pH level, alkalinity level, and specific conductivity level to meet at least one of a target specific conductivity level, a target alkalinity level, and a target pH level,
   wherein the controlling flow of the gas comprises decreasing the flow of gas and/or the dissolved oxygen level when the pH level is lower than a pH setpoint, or increasing the flow of gas and/or the dissolved oxygen level when the pH level is higher than the pH setpoint.

2. The method of claim 1, wherein the gas comprises air or purified oxygen or a blend thereof.

3. The method of claim 1, wherein the controlling of flow of the gas comprises an appropriately tuned proportional, a proportional-integral, a proportional-integral-derivative, or a logic-based process.

4. The method of claim 1, further comprising measuring nitrate and ammonia in an influent and in an effluent to determine a nitrate production ratio level.

5. The method of claim 4, wherein the specific conductivity level is controlled according to a nitrate production ratio setpoint such that when the nitrate production ratio level is higher than the nitrate production ratio setpoint the specific conductivity setpoint is increased.

6. The method of claim 4, wherein an ammonium concentration level is controlled according to a nitrate production ratio setpoint such that when the nitrate production ratio level is higher than the nitrate production ratio setpoint an ammonium concentration setpoint is increased.

7. The method of claim 4, wherein the pH is controlled according to a nitrate production ratio setpoint such that when the nitrate production ratio level is higher than the nitrate production ratio setpoint the pH setpoint is increased.

8. The method of claim 4, wherein the alkalinity is controlled according to a nitrate production ratio setpoint such that when the nitrate production ratio level is higher than the nitrate production ratio setpoint the alkalinity setpoint is increased.

9. A method of treating ammonium containing water in a wastewater treatment site, the method comprising:
   receiving a plurality of sensor signals, the plurality of sensor signals comprising a dissolved oxygen level and at least one of a pH level, an alkalinity level, and a specific conductivity level; and
   controlling flow of a gas into the wastewater treatment site based on the dissolved oxygen level and said at least one of the pH level, alkalinity level, and specific conductivity level to meet at least one of a target specific conductivity level, a target alkalinity level, and a target pH level,
   wherein the controlling flow of a gas to meet the at least one of the target specific conductivity level, target alkalinity level, and target pH level is in a continuous flow moving bed biofilm reactor in which partial nitritation and anaerobic ammonium oxidation both occur on a biofilm carrier,
   wherein the controlling flow of the gas comprises decreasing the flow of gas and/or the dissolved oxygen level when the pH level is lower than a pH setpoint, or increasing the flow of gas and/or the dissolved oxygen level when the pH level is higher than the pH setpoint.

10. The method of claim 9, further comprising measuring at least one of the specific conductivity level, alkalinity level, and pH level in a reactor or in an effluent from the reactor.

11. The method of claim 9, further comprising controlling a gas valve position and/or a blower output based on the at least one of the specific conductivity level, alkalinity level, and pH level.

12. The method of claim 9, further comprising controlling a gas flow rate setpoint and/or a dissolved oxygen setpoint based on the at least one of the specific conductivity level, alkalinity level, and pH level.

13. The method of claim 12, further comprising controlling a valve position or a blower output based on the gas flow rate setpoint.

14. The method of claim 9, further comprising decreasing the flow of gas and/or the dissolved oxygen level when the specific conductivity level is lower than a specific conductivity setpoint, or increasing the flow of gas and/or the dissolved oxygen level when the specific conductivity level is higher than the specific conductivity setpoint.

15. The method of claim 9, further comprising decreasing the flow of gas and/or the dissolved oxygen level when an ammonium concentration level is lower than an ammonium concentration setpoint, or increasing the flow of gas and/or the dissolved oxygen level when the ammonium concentration level is higher than the ammonium concentration setpoint.

16. The method of claim 9, further comprising decreasing the flow of gas and/or the dissolved oxygen level when the alkalinity level is lower than an alkalinity setpoint, or increasing the flow of gas and/or the dissolved oxygen level when the alkalinity level is higher than the alkalinity setpoint.

17. The method of claim 9, wherein the gas comprises air or purified oxygen or a blend thereof.

18. A method of treating ammonium containing water in a wastewater treatment site, the method comprising:
  receiving a plurality of sensor signals, the plurality of sensor signals comprising a dissolved oxygen level and at least one of a pH level, an alkalinity level, and a specific conductivity level; and
  controlling flow of a gas into the wastewater treatment site based on the dissolved oxygen level and said at least one of the pH level, alkalinity level, and specific conductivity level to meet at least one of a target specific conductivity level, a target alkalinity level, and a target pH level,
  wherein controlling flow of a gas to meet the at least one of the target specific conductivity level, target alkalinity level, and target pH level is in a continuous flow integrated fixed film activated sludge reactor in which partial nitritation occurs in a bulk suspended biomass fraction and anaerobic ammonium oxidation occurs on a biofilm carrier, and
  wherein the controlling flow of the gas comprises decreasing the flow of gas and/or the dissolved oxygen level when the pH level is lower than a pH setpoint, or increasing the flow of gas and/or the dissolved oxygen level when the pH level is higher than the pH setpoint.

19. The method of claim 18, further comprising measuring at least one of the specific conductivity level, alkalinity level, and pH level in a reactor or in an effluent from the reactor.

20. The method of claim 18, further comprising controlling a gas valve position and/or a blower output based on the at least one of the specific conductivity level, alkalinity level, and pH level.

21. The method of claim 18, further comprising controlling a gas flow rate setpoint and/or a dissolved oxygen setpoint based on the at least one of the specific conductivity level, alkalinity level, and pH level.

22. The method of claim 21, further comprising controlling the gas flow rate setpoint based on the dissolved oxygen setpoint.

23. The method of claim 18, further comprising decreasing the flow of gas and/or the dissolved oxygen level when the specific conductivity level is lower than a specific conductivity setpoint, or increasing the flow of gas and/or the dissolved oxygen level when the specific conductivity level is higher than the specific conductivity setpoint.

24. The method of claim 18, further comprising decreasing the flow of gas and/or the dissolved oxygen level when an ammonium concentration level is lower than an ammonium concentration setpoint, or increasing the flow of gas and/or the dissolved oxygen level when the ammonium concentration level is higher than the ammonium concentration setpoint.

25. The method of claim 18, further comprising decreasing the flow of gas and/or the dissolved oxygen level when the alkalinity level is lower than an alkalinity setpoint, or increasing the flow of gas and/or the dissolved oxygen level when the alkalinity level is higher than the alkalinity setpoint.

26. The method of claim 18, wherein the gas comprises air or purified oxygen or a blend thereof.

* * * * *